US008325186B2

(12) United States Patent
Diamand

(10) Patent No.: US 8,325,186 B2
(45) Date of Patent: Dec. 4, 2012

(54) METHOD AND APPARATUS FOR RENDERING SHADOWS

(75) Inventor: Ben Diamand, Sherman Oaks, CA (US)

(73) Assignee: Sony Computer Entertainment America LLC, Foster City, CA (US)

( * ) Notice: Subject to any disclaimer, the term of this patent is extended or adjusted under 35 U.S.C. 154(b) by 92 days.

(21) Appl. No.: 12/784,435

(22) Filed: May 20, 2010

(65) Prior Publication Data

US 2010/0295851 A1  Nov. 25, 2010

Related U.S. Application Data

(63) Continuation-in-part of application No. 12/718,866, filed on Mar. 5, 2010.

(60) Provisional application No. 61/312,656, filed on Mar. 10, 2010, provisional application No. 61/180,389, filed on May 21, 2009.

(51) Int. Cl.
*G06T 15/50* (2011.01)
(52) U.S. Cl. .................. 345/426; 345/419; 345/607
(58) Field of Classification Search .................. None
See application file for complete search history.

(56) References Cited

U.S. PATENT DOCUMENTS

| 5,347,374 | A | 9/1994 | Fuss et al. | |
| 6,903,741 | B2 * | 6/2005 | Corbetta | 345/426 |
| 7,006,684 | B2 * | 2/2006 | Thornber et al. | 382/154 |
| 7,142,709 | B2 | 11/2006 | Girard | |
| 8,139,060 | B2 * | 3/2012 | Brown et al. | 345/426 |
| 2003/0179197 | A1 * | 9/2003 | Sloan et al. | 345/426 |
| 2004/0032409 | A1 * | 2/2004 | Girard | 345/426 |
| 2006/0221250 | A1 | 10/2006 | Rossbach et al. | |
| 2007/0002047 | A1 | 1/2007 | Desgranges et al. | |
| 2009/0167763 | A1 * | 7/2009 | Waechter et al. | 345/426 |
| 2010/0295853 | A1 | 11/2010 | Diamand | |

OTHER PUBLICATIONS

Patent Cooperation Treaty; "Notification of Transmittal of the International Preliminary Report on Patentability" issued in corresponding PCT/US10/35676; mailed Sep. 27, 2011; 12 pages.

(Continued)

*Primary Examiner* — Said Broome
(74) *Attorney, Agent, or Firm* — Fitch, Even, Tabin & Flannery, LLP

(57) ABSTRACT

A method including identifying a set of shadow casters and a set of shadow receivers in a frame of a scene lighted by at least a first light source, constructing a first 3D grid from the first light source's point of view fully enclosing a first volume of the scene, projecting each of the one or more shadow casters and growing each cell of the first 3D grid that includes one or more projected casters. Constructing a second 3D grid from the first light source's point of view fully enclosing the first volume and growing each cell of the second 3D grid that includes at least a portion of one or more shadow receivers and for which a corresponding cell of the first 3D grid has been grown. Forming a third 3D grid by intersecting the first 3D grid with the second 3D grid and marking for rendering into a shadow map each shadow caster that intersects the third 3D grid.

24 Claims, 14 Drawing Sheets

OTHER PUBLICATIONS

Patent Cooperation Treaty; "Notification of Transmital of the International Search Report and the Written Opinion of the International Searching Authority or the Declaration" issued in corresponding PCT/US10/35676; mailed Sep. 23, 2010; 2 pages.

Patent Cooperation Treaty; "International Search Report" issued in corresponding PCT/US10/35676; mailed Sep. 23, 2010; 4 pages.

Patent Cooperation Treaty; "Written Opinion of the International Searching Authority" issued in corresponding PCT/US10/35676; mailed Sep. 23, 2010; 11 pages.

Boulanger, Real-Time Realistic Rendering of Nature Scenes with Dynamic Lighting, M.S. Inria, University of Rennes I, France, 2005. [Retrieved on Sep. 15, 2010]. Retrieved from the Internet: <URL:http://www.kevinboulanger.net/publications/thesisKevinBoulanger.pdf> pp. i-xx and 1-171.

Sloan; Peter-Pike et al.; "Image-Based Proxy Accumulation for Real-Time Soft Global Illumination"; Pacific Graphics 2007; Oct. 2007; pp. 1-9.

U.S. Appl. No. 61/312,656; filed Mar. 10, 2010; Inventor Ben Diamond: entitled "Method and Apparatus for Rendering Shadows"; all pages.

U.S. Appl. No. 61/180,389; filed May 21, 2009; Inventor Ben Diamand; entitled "Method and Apparatus for Rendering Image Based Projected Shadows With Multiple Depth Aware Blurs"; all pages.

* cited by examiner

METHOD AND APPARATUS FOR RENDERING SHADOWS

CROSS-REFERENCE TO RELATED APPLICATIONS

This application claims the benefit of U.S. Provisional Application No. 61/312,656, filed Mar. 10, 2010, entitled "METHOD AND APPARATUS FOR RENDERING SHADOWS", the entire content and disclosure of which is hereby incorporated by reference herein in its entirety.

This application also claims the benefit of U.S. Provisional Application No. 61/180,389, filed May 21, 2009, entitled "METHOD AND APPARATUS FOR RENDERING IMAGE BASED PROJECTED SHADOWS WITH MULTIPLE DEPTH AWARE BLURS", the entire content and disclosure of which is hereby incorporated by reference herein in its entirety.

This application is a continuation-in-part of U.S. application Ser. No. 12/718,866 filed Mar. 5, 2010, entitled "METHOD AND APPARATUS FOR RENDERING IMAGE BASED PROJECTED SHADOWS WITH MULTIPLE DEPTH AWARE BLURS", the entire content and disclosure of which is hereby incorporated by reference herein in its entirety.

BACKGROUND OF THE INVENTION

1. Field of the Invention

The present invention relates generally to computer graphics, and more specifically to rendering shadows in computer graphics.

2. Discussion of the Related Art

Shadow mapping is a process by which shadows are added to three-dimensional (3D) computer graphics.

SUMMARY OF THE INVENTION

Several embodiments of the invention advantageously provide a computer readable storage medium storing one or more computer programs adapted to cause a processor based system to execute steps comprising identifying a set of shadow casters and a set of shadow receivers in a frame of a scene that is lighted by at least a first light source, constructing a first three-dimensional (3D) grid, from the first light source's point of view, that fully encloses a first volume of the scene, comprising one or more shadow casters of the set of shadow casters that fall within the first volume of the scene, projecting each of the one or more shadow casters to generate one or more projected shadow casters, growing each cell of the first 3D grid that includes at least a portion of the one or more projected casters, constructing a second three-dimensional (3D) grid, from the first light source's point of view, that fully encloses the first volume of the scene, comprising one or more shadow receivers of the set of shadow receivers that fall within the first volume of the scene, growing each cell of the second 3D grid that includes at least a portion of at least one of the one or more shadow receivers and for which a corresponding cell of the first 3D grid has been grown, marking for rendering each shadow receiver for which a cell of the second 3D grid has been grown, forming a third 3D grid by intersecting the first 3D grid with the second 3D grid such that the third 3D grid comprises the grown cells of the first grid and the grown cells of the second grid that intersect and marking for rendering into a shadow map each shadow caster that intersects the third 3D grid.

Another embodiment of the present invention provides a method comprising identifying a set of shadow casters and a set of shadow receivers in a frame of a scene that is lighted by at least a first light source, constructing a first three-dimensional (3D) grid, from the first light source's point of view, that fully encloses a first volume of the scene, comprising one or more shadow casters of the set of shadow casters that fall within the first volume of the scene, projecting each of the one or more shadow casters to generate one or more projected shadow casters, growing each cell of the first 3D grid that includes at least a portion of the one or more projected casters, constructing a second three-dimensional (3D) grid, from the first light source's point of view, that fully encloses the first volume of the scene, comprising one or more shadow receivers of the set of shadow receivers that fall within the first volume of the scene, growing each cell of the second 3D grid that includes at least a portion of at least one of the one or more shadow receivers and for which a corresponding cell of the first 3D grid has been grown, marking for rendering each shadow receiver for which a cell of the second 3D grid has been grown, forming a third 3D grid by intersecting the first 3D grid with the second 3D grid such that the third 3D grid comprises the grown cells of the first grid and the grown cells of the second grid that intersect and marking for rendering into a shadow map each shadow caster that intersects the third 3D grid.

Yet another embodiment provides an apparatus, comprising a display and a processor based system coupled to the display, wherein the processor based system is configured to execute steps comprising identifying a set of shadow casters and a set of shadow receivers in a frame of a scene that is lighted by at least a first light source, constructing a first three-dimensional (3D) grid, from the first light source's point of view, that fully encloses a first volume of the scene, comprising one or more shadow casters of the set of shadow casters that fall within the first volume of the scene, projecting each of the one or more shadow casters to generate one or more projected shadow casters, growing each cell of the first 3D grid that includes at least a portion of the one or more projected casters, constructing a second three-dimensional (3D) grid, from the first light source's point of view, that fully encloses the first volume of the scene, comprising one or more shadow receivers of the set of shadow receivers that fall within the first volume of the scene, growing each cell of the second 3D grid that includes at least a portion of at least one of the one or more shadow receivers and for which a corresponding cell of the first 3D grid has been grown, marking for rendering each shadow receiver for which a cell of the second 3D grid has been grown, forming a third 3D grid by intersecting the first 3D grid with the second 3D grid such that the third 3D grid comprises the grown cells of the first grid and the grown cells of the second grid that intersect and marking for rendering into a shadow map each shadow caster that intersects the third 3D grid.

BRIEF DESCRIPTION OF THE DRAWINGS

The above and other aspects, features and advantages of several embodiments of the present invention will be more apparent from the following more particular description thereof, presented in conjunction with the following drawings.

Figure 1:
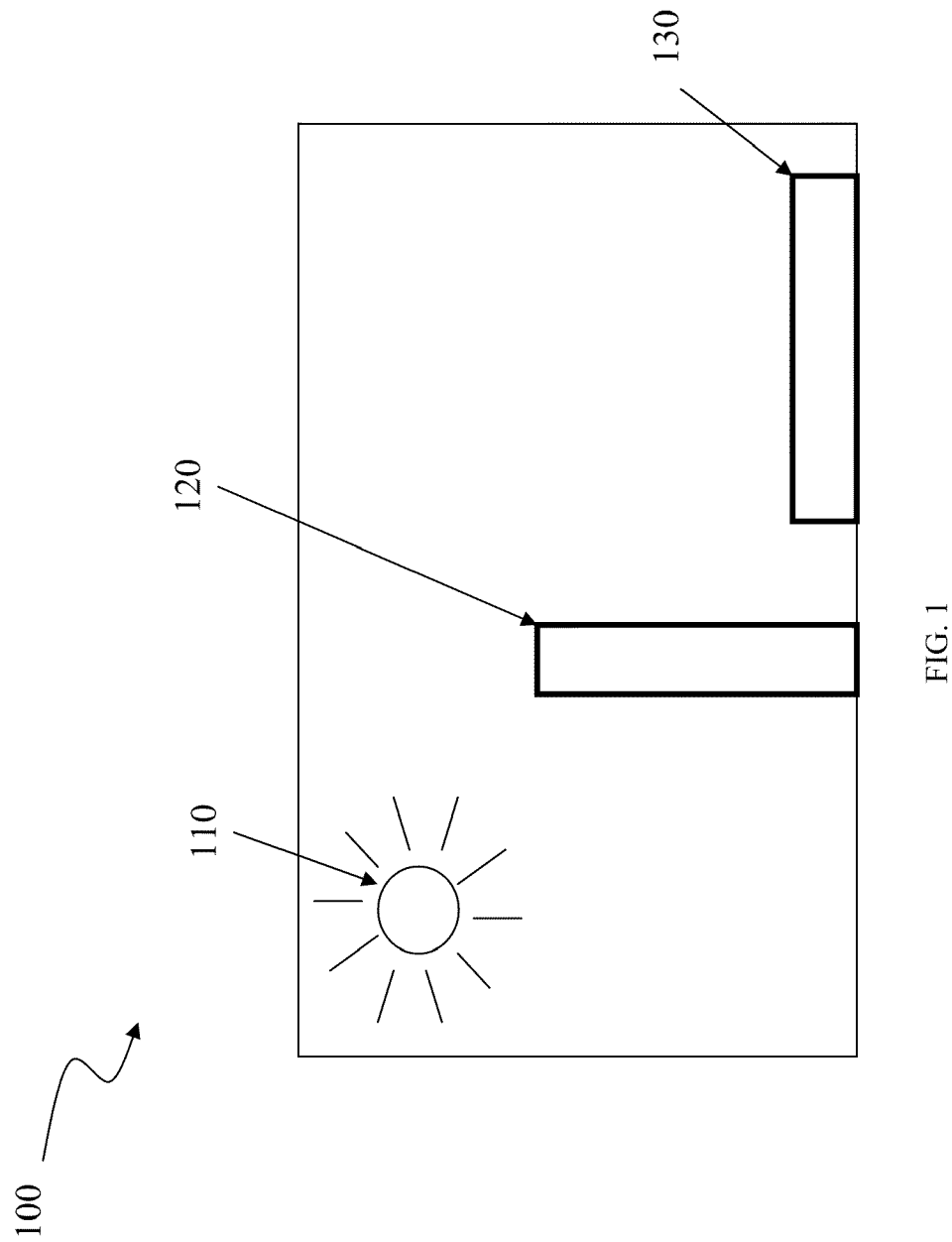
FIG. 1 illustrates a simplified exemplary frame of content of a scene, according to several embodiments of the present invention.

Corresponding reference characters indicate corresponding components throughout the several views of the drawings. Skilled artisans will appreciate that elements in the figures are illustrated for simplicity and clarity and have not necessarily been drawn to scale. For example, the dimensions of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention.

DETAILED DESCRIPTION

The following description is not to be taken in a limiting sense, but is made merely for the purpose of describing the general principles of exemplary embodiments. The scope of the invention should be determined with reference to the claims.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided to provide a thorough understanding of embodiments of the invention. One skilled in the relevant art will recognize, however, that the invention can be practiced without one or more of the specific details, or with other methods, components, materials, and so forth. In other instances, well-known structures, materials, or operations are not shown or described in detail to avoid obscuring aspects of the invention.

Image-based modeling and rendering methods rely on a set of two-dimensional (2D) images of a scene to generate a 3D model and then render some novel views of this scene. Such methods eliminate the need to manually create a geometric model in 3D. When an object is rendered in 3D graphics, shadows have to be rendered with respect to the placement of objects in the scene. Shadow mapping is a process by which shadows are added to 3D computer graphics. The process of creating shadows generally involves testing whether a pixel is in the volume where any casters project over and whether the pixel is visible from the light source.

Some of the embodiments of the present invention provide one or more methods for rendering shadows in 3D computer graphics in real time that are fast and that provide sharp shadows with high resolution.

FIG. 1 illustrates a simplified exemplary frame of content of a scene. The frame 100 includes a light source 110, a shadow caster 120, and a shadow receiver 130. A shadow caster is an object that casts shadows. A shadow receiver is an object that receives shadows, meaning that shadows can be cast onto it. In one embodiment, the shadow caster 120 may be an object such as a wall or any other object, and the shadow receiver 130 may be an object such as piece of wood lying on the ground, the ground itself, or any other object. The shadow caster 120 casts a shadow onto the shadow receiver 130. The shadow caster 120 and the shadow receiver 130 comprise a group of objects that includes one or more shadow casters and corresponding shadow receivers. Stated differently, the shadow caster 120 and the shadow receiver 130 comprise a casters/receivers pair. In the following description a shadow caster is sometimes referred to as simply a "caster" and a shadow receiver is sometimes referred to as a simply a "receiver". In some embodiments, each scene and/or portion of a scene comprises a set of casters and receivers referred to herein as a shadow set (SS).

In some embodiments, shadows are collected and computed inside the opaque phase of a rendering flow. In one embodiment, the shadows are rendered using a single shadow map. A shadow map is generated by taking a picture of a scene from the light's point of view, also referred to as shadow's point of view. Next inside the opaque pass each pixel is examined and transferred into shadow space and if it is determined that the pixel is further away from the light than the depth value in the shadow map, it is assumed to be in shadow.

However, having a single shadow map for a scene may raise issues with resolution according to some embodiments. That is, with certain scenes, a single map may not provide the right resolution for all pixels. For example, objects that are up close in the scene may have two few shadow texels or shadow texture elements, and objects that are too far will have too many texels. One solution, according to some embodiments, may be to create a large map, such that enough texels can be provided for each object on the screen, i.e. maintaining at least one filtered texel per pixel, where optimal would be exactly one filtered pixel per texel. However, in certain situations, a single large map may lead to very low speeds in rendering shadows and may lead to waste of resources during the rendering process. In one embodiment, when one shadow map is used for the scene, oversampling may occur, as the shadow map contains too many samples where choosing from among the excess is wasteful. In other embodiments, undersampling may occur where the shadow map contains too few samples and extra samples must be synthesized by excess filtering and sampling. Sampling tends to be a large portion of the cost in the rendering process, and therefore, in some embodiments, it is desirable to optimize the process of shadowing to reduce oversampling and/or undersampling as much as possible. The larger the map, the more the chance is for oversampling, and the smaller the map, the more undersampling problems arise.

Accordingly, in some embodiments, the present system provides a method of rendering shadows that uses more than one shadow depth map. For example, in one embodiment, the present system employs cascade shadow maps or parallel split shadow maps. For example, in one embodiment, cascade shadow maps may be used to address undersampling and oversampling issues. Cascade maps employ the concept of splitting the viewing frustum into "cascades". According to one or more embodiments, each cascade has its own near and far plane parallel to the original near and far plane of the viewing frustum. In one embodiment, cascades are achieved by dividing the scene along the camera view direction to achieve multiple frustums each having a near and far plane.

Next, each cascade has to be rendered. That is, in one embodiment, instead of rendering a shadow map once for the entire scene, the system will have to render once for each of the cascades. To achieve this, in some embodiments, the shadow map is divided into multiple shadow maps. That is, in one embodiment, for example, the shadow map is divided into as many maps as there are cascades. For example, in one embodiment, the scene is divided into four cascades, and according the original 1024×1024 shadow map is divided into four 512×512 maps one for each cascade. This improves the texel to pixel ratio, because the volume of the near cascades are smaller and therefore, provide more sample texels for the close up objects in the scene, and provide for improved resolution.

In some embodiments, to address ALU load caused by creating cascades, the renderer will be able to specify how many cascades will be used for a particular scene. That is, in one embodiment, each scene may have a unique number of cascades depending on the resolution demands for that scene.

In additional or alternative embodiments, the issue of ALU load may be addressed by deferring shadows. In some embodiments, PCF sampling may be performed for shadowed geometry that is eventually occluded leading to wasted sampling in this type of opaque "overdraw". This issue is addressed, in one embodiment, by deferring shadows. The deferred shadow is referred to herein as a white buffer (WB), according to some embodiments of the present invention. In one embodiment, the white buffer is a full screen buffer, having all the results of all of the PCF sampling for a scene and/or cascade. In some embodiments, the white buffer is initially set to white, representing a maximal, or unshadowed value. In one embodiment, a full screen buffer may be used having all shadow data. In one embodiment, the white buffer may be composed of a depth buffer and a colored buffer. In one embodiment, the depth buffer contents may be shared with the rest of the render pipeline, and in particular with the opaque pass. In some embodiments, the white buffer may be written to at full resolution. In one embodiment, the white buffer may be cleared and the depth may be set to its default value, and the color set to full intensity, i.e. white.

In some embodiment, by using a white buffer or deferred shadow buffer, shadow transformation and PCF sampling may no longer be performed within the opaque pass. In such embodiments, instead, shadowing in the opaque pass may comprise point-sampling a screen sized texture, i.e., the white buffer. In such embodiment, the process of determining per pixel shadows is done in a single step, instead of having to potentially sample multiple times. In one embodiment, the white buffer is both overdraw independent and shadow sampler independent. That is, in some embodiments, the opaque shader samples a single map. Further, in some embodiments, there are four channels available, therefore, in such embodiments, up to four light source's shadow data may be put into a single deferred map.

In some embodiments, deferring shadows further allows for having freedom with respect to the size of maps for each cascade of a scene. That is, in some embodiments, any map size up to the original map size may be chosen for each of the cascades in the scene. In one embodiment, this is possible because more than one shadow map may be successively put onto the actual map before being accumulated into the WB.

In some embodiments, using deferred maps, the process of shadow rendering may be further optimized by using depth values obtained from the z-pass, e.g. a ZCull unit. In one embodiment, a ZCull unit provides both a Zfar and Znear. In such embodiments, the system can obtain data to exclude pixels having a depth that is farther away than what is already in the depth map. Further, having a Znear, in some embodiments, allows ignoring pixels independent of their incoming interpolated depth. That is, in one or more embodiments, the ZCull unit may enable the system to wholesale reject pixels if the depth underneath the pixels is outside of a selected range.

In some embodiments, for each cascade a full screen pass is performed. However, in some embodiments, using Zcull depth bounds, only appropriate pixels are drawn during the pass, such that only pixels in the specific cascade are drawn for the specific white buffer.

In some embodiments, while cascades and deferred shadow maps provide larger map sizes, the map size may still be limiting for certain scenes. That is, in some embodiments, a ratio of one texel per screen pixel, or even better ratio may be desired. Having an upper bound of the shadow map size, limited by the original map size, leads to not being able to achieve such ratios for certain scenes. In one embodiment, this is addressed with the concept of tiling the shadow map.

In one embodiment, the depth map may be tiled, in 2D. That is, in some embodiments, after the viewing frustum is tiled by cascades along the volume, the shadow map is further tiled in 2D. In one embodiment, the shadow maps may be tiled as many times as desired and accumulated one at a time into the white buffer. In some embodiments, MIN blending may be used to achieve this.

In one embodiment, tiling may be performed on all cascades of the scene. In another embodiment, titling may be performed on less than all cascades. For example, in one embodiment, only the first few cascades may be tiled and the other cascades may be rendered without tiling. In some embodiments, additional cascades may be added. In one embodiment, scenes may be rendered with better quality by adding additional cascades.

In one embodiment, the setting for each cascade may be user, e.g. game maker, etc., controllable. In one embodiment, the user's view of the shadows may involve multiple explicit cascades, and settings for each cascade, such as resolution, i.e., texels per world unit, may be set for each cascade by the user. In some embodiments, further, the user may be provided with a "quality" knob to control the amount of PCF sampling performed per cascade.

The process of optimizing the white buffer and ultimately shadow rendering, according to several embodiments of the present invention is based on the concept of shadows and how objects receive shadows. Namely, one or more embodiments of the present invention take advantage of determining when pixels should or should not receive shadows. According to several embodiments, certain pixels do not receive shadow and therefore may be occluded to optimize the shadow rendering process. Accordingly, in several embodiments, pixels are tested to determine whether they are within a volume of space that one or more casters project over. In further embodiments, additionally or alternatively, for pixels within a volume where casters project over, it is determined whether the caster is supposed to affect the pixel.

Figure 2:
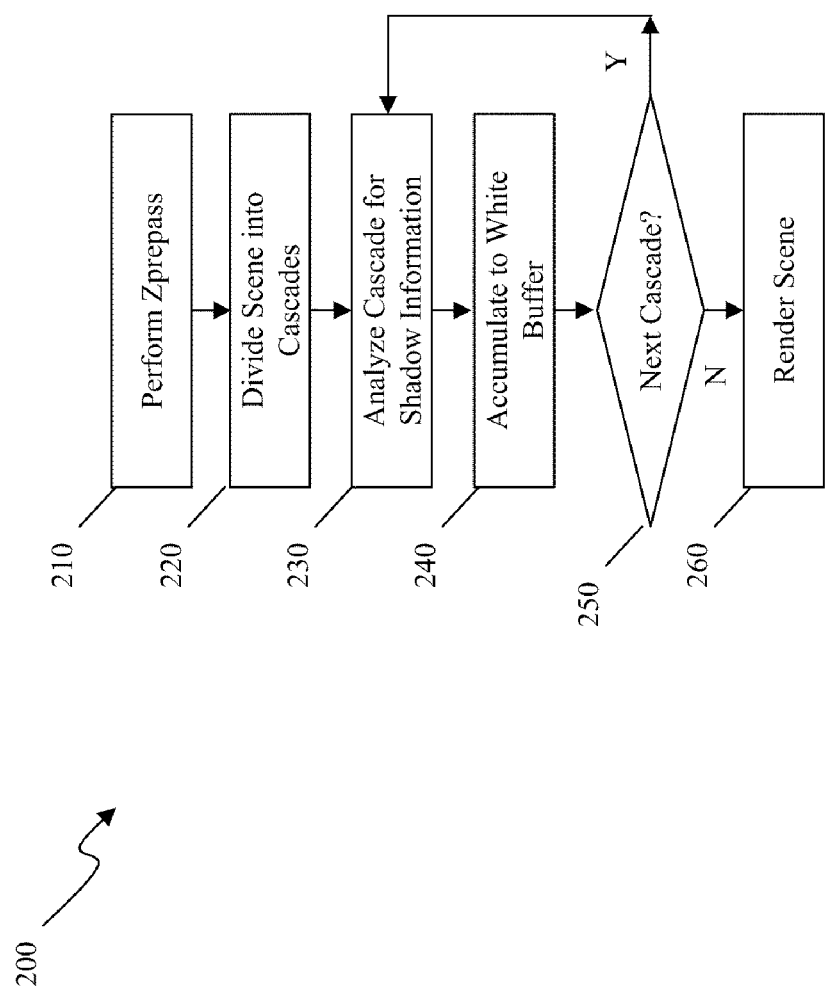
FIG. 2 illustrates an exemplary flow diagram of a rendering flow for rendering a scene according to several embodiments of the present invention.

FIG. 2 illustrates an exemplary flow diagram of a rendering flow 200 for rendering a scene according to several embodiments.

In step 210 a Zprepass is performed on all rendering geometry in the scene. Next, in step 220, the scene is divided into one or more cascades. Next, in step 230, the first cascade is analyzed for shadow information. Next, in step 240, a white buffer is generated for the cascade. In step 250 it is determined whether a next cascade is present, and when it is determined that a next cascade is present the above step 230 and 240 are repeated for the next cascade. If on the other hand, if in step 250 it is determined that all cascades of step 220 have been analyzed and a white buffer has been generated for all cascades, then the process continues to the opaque stage of the rendering flow.

Figure 3:
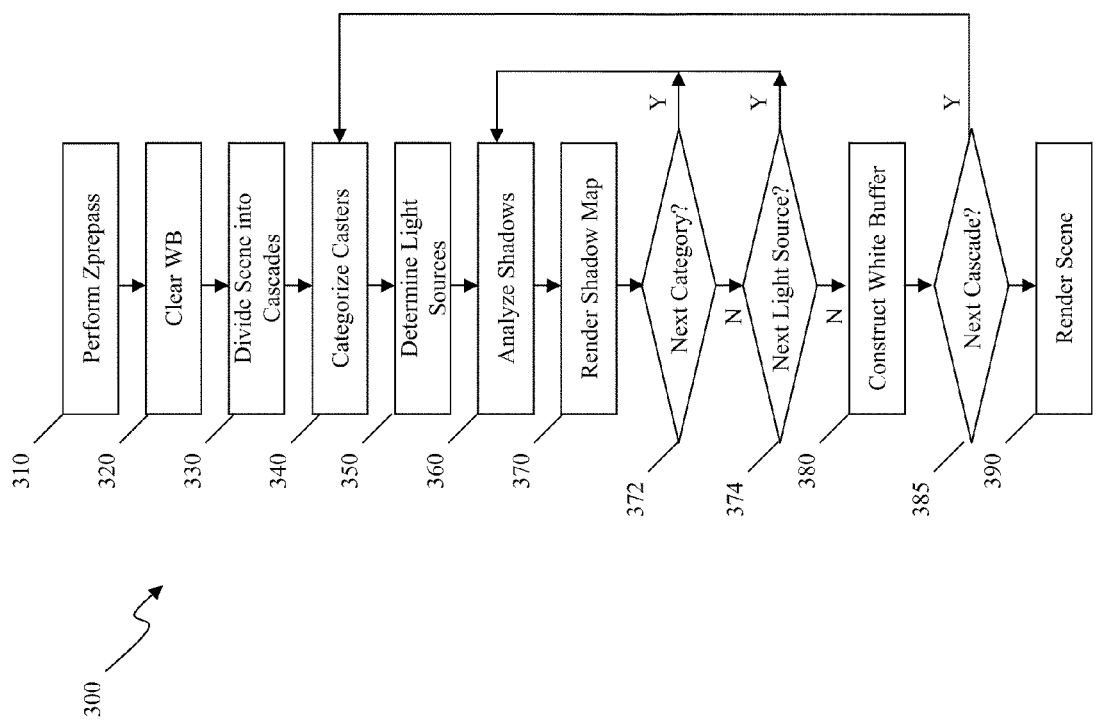
FIG. 3 illustrates a more detailed flow diagram of the rendering flow for rendering shadows within a scene according to several embodiments of the present invention.

FIG. 3 illustrates a more detailed flow diagram of the rendering flow for rendering shadows within a scene according to several embodiments.

As illustrated, in step 310, the system performs a Zprepass for all rendering geometry in a scene. In one embodiment, the depth values may be later used to reconstruct receivers. In some embodiments, during this step a "type" is determined for each receiver. In one embodiment, a value indicating the determined "type" for the receivers is written in the stencil. For example, in one embodiment the "type" value may represent one of: "none", i.e., no type available for the receiver, "background", "minor", or any other identifier. In one embodiment, the remaining stencil bit may be used to write a more geometrically unique identifier for each of the receivers.

Next, in step 320, the white buffer is cleared. As discussed above, white buffer (WB), may be a full screen buffer that has all shadow data. In one embodiment, the white buffer is a full screen buffer identical in size to the back buffer. In one embodiment, the white buffer may be a 1280×720 buffer. However, it should be obvious to one skilled in the art that different size buffers may be used for different purposes. In one embodiment, the white buffer may be anti-aliased. In some embodiments, the white buffer may be composed of a depth buffer and a color buffer. In some embodiments, the white buffer is written to at full resolution. In some embodiments, the white buffer is initially cleared and the depth is set to its default value, and the color is initially set to full intensity (white).

Next, in step 330, the scene is divided into a number of cascades. In different embodiments different number of cascades may be used according to several factors. For example, in one embodiment, the scene may be divided into three cascades. In some embodiments, for each scene, the number of cascades may be varied based on several factors including for example the requirements of a scene and/or the preferences of the user, e.g. game maker.

In step 340, casters are divided into categories. For example, in one embodiment, the categories may include: (a) casters that cast on everything, (b) casters that cast on everything but don't otherwise render, (c) casters that cast only on background, and not on themselves, (d) casters that cast only on not background but don't otherwise cast. Other categories may be used and the above mentioned categories only provide examples of possible categories for casters.

Next, in step 350, the process determines the light sources in the scene. In some embodiments, each light source within the scene may cause the casters to set a unique set of shadows on the receivers, and therefore, the system may analyze the light sources separately. In one embodiment, the shadow information for each light source may be written into a different channel within the white buffer. In another embodiment, all shadow information may be written into the same channel in the while buffer.

In step 360, for the first cascade, the process analyzes the shadows with respect to each category of caster, for each light source. In one embodiment, this step comprises constructing a 3D caster grid, constructing a 3D receiver grid, intersecting the grids to form a new grid, identifying casters that intersect this new intersection grid and using the new grid to exclude portions of the screen from receiving shadows. The process for analyzing shadow according to some embodiments is described in further detail below in FIG. 4.

Figure 4:
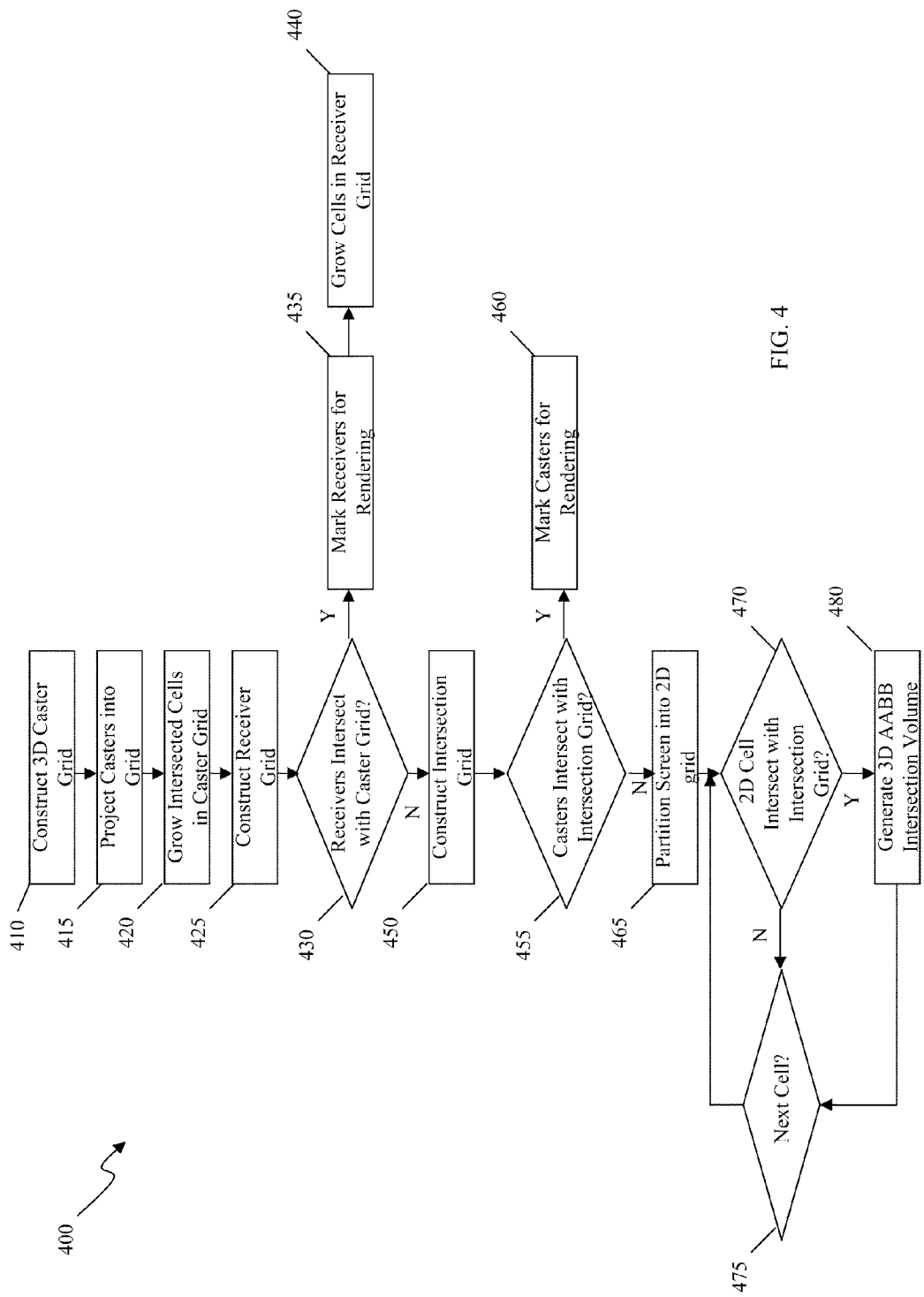
FIG. 4 illustrates a method for analyzing shadows accordingly to several embodiments of the present invention.

In step 370, the process renders the shadow map for all casters found to cast a shadow as determined during the analyzing step 360. In one embodiment, these casters refer to those that intersect with the receivers in the caster receiver grid of step 460 of FIG. 4. In one embodiment, the casters for each light source, category, cascade and tile are rendered into the shadow map. Further, in some embodiments, when rendering 2D cells for drawing the receiver pixels, the receiver sections determined in step 440 of FIG. 4 are drawn. In a further embodiment, during the rendering of the shadow map, using the depth information available, e.g. as determined in step 410, the pixels whose z buffers fall outside of the depth bounds may be ignored and not drawn. In such embodiments, the rendering of the shadow map is optimized as many pixels can be thrown away.

In one embodiment, before rendering the shadow map, the shadow map is tiled. In some embodiments, the tiling of the shadow map may increase the rendered resolution, which relates to the shadow texel to pixel ratio. In one embodiment a setting relating to a desired shadow texel to meter ratio is provided. In some embodiments, to keep a constant number of shadow texels per world unit, it may be necessary to make some number of sub-cascades, which uses all the information gathered above. In one embodiment, the process may breakup the number of shadow maps assigned to a cascade, i.e. tile the shadow map. In one embodiment, any number of tiles per cascade may be created to satisfy the required shadow texel to world unit requirement.

In one embodiment, at runtime a maximum and/or minimum number may be set for the number of tiles. In one embodiment, for example the minimum number of tiles may be set equal to 1. In some embodiments, the maximum number of tiles may be set to any number deemed appropriate for the specific situation and what is desired. Further, in some embodiments, to further optimize the process, tiles with very small dimensions on a side may be omitted by slightly adjusting the shadow texel to world unit ratio as needed. In one embodiment, tiles may be trimmed when they occupy a very small number of texels and/or the tile is a direct result of overflowing of a previous tile's texels.

Next, the process moves to step 380 and constructs a white buffer based on the shadow map of step 370. In some embodiments, a shadow map is rendered for each unique cascade, light source and category combination. In such embodiments, the system will repeat the steps 360 and 370 for each category and for each light source within the cascade. For example in one embodiment, the optional steps 372 and 374 may be performed to ensure that a shadow map is rendered for each unique combination. Next, if it is determined that a shadow map is rendered for each combination of light source and category for the cascade, the process continues to step 380 where the white buffer is generated for the cascade.

In one embodiment, for each light source, category, cascade and tile combination, the depth buffer is sampled during this step. In some embodiments, additionally or alternatively, a camera-space or world space position is determined and reconstructed. The camera space or world space position is then transformed into texture coordinates according to one embodiment. In a further embodiment, the shadow map is then sampled. In one embodiment, as a quality improvement measure multiple PCF samples may be taken. According to one embodiment, the process of creating a shadow map is repeated for each light source and category combination for each cascade.

In one embodiment, for each 2D grid cell, a stencil value of from the Zprepass of step 310 may be used to discriminate which pixels receive shadow. For example, in some embodiments, if the stencil indicates that a pixel is a background pixel, but the category is "cast only on not background, but otherwise don't render," from step 320, then that pixel will be ignored by the stencil hardware. In some embodiments, 3D extent information gathered with respect to each 2D grid is used to perform depth bounds testing to eliminate un-shadowed pixels.

In several embodiments, the ZCull unit includes one or more features that are effective in improving the performance of the shadowing process. In some embodiments, in addition the Znear and Zfar, the system further includes a stencil reject buffer. In one embodiment, geometry culling is performed per draw call bounds. In some embodiments, accordingly, the system may be capable of rejecting on the basis of depth and/or stencil. In some embodiments, the rejection can be done on the basis of both depth and stencil at the same time.

In one embodiment, rejection may be very fast. For example, in one embodiment, rejection may be approximately eight times faster than the nominal accept rate. In one embodiment, the nominal accept rate corresponds to running a one cycle pixel shader. In some embodiments, the shadow shader may comprise 5 cycles. In such embodiments, this will lead to the process being approximately 40 times faster. In one embodiment, using the stencil minor characters are drawn with better precision and faster speed.

In one embodiment, a resultant shadow value is accumulated into the WB, using MIN blending. In one embodiment all shadow values may be accumulated into the same color component. In an alternative embodiment, the shadow values are segregated by light source, so that each lights gets its own set of shadow samples, or shadow set. In one embodiment, using MIN blending the order of operations for laying down shadow samples may be ignored.

In one embodiment, at the end of step 385, the WB includes all the shadow information. In some embodiments, where Multi-Sample Anti-Aliasing (MSAA) is employed, the WB will be at MSAA resolution in number of pixels, but in terms of data it will only be at non-MSAA effective resolution. In some embodiments, this can cause artifacts when the lighting pass runs, since the lighting pass samples will not always be in agreement with the shadow samples that exist in the WB. In some embodiments, as described above, stencil values written in step 310 include a semi-unique group ID for each group of geometry. In some embodiments, the stencil values are used to dilate the WB. In some embodiments, for example, a "plus" pattern of MIN of four neighbors of every pixel MINed with each WB pixel may be used in dilating the WB. This may be useful in hiding nearly all depth discontinuity artifacts. In some embodiments, the dilation may involve examining the anti-aliasing pixel transition between light and dark and growing the dark based on the assumption that dark provides a better picture.

Next, in step 385, it is determined if a WB has been created for all of the cascades. If it is determined that a WB has not been constructed for one or more of the cascades, the process returns to step 340 and repeats steps 340-380 for each cascade generated in step 330.

On the other hand, if in step 385 it is determined that a WB has been constructed for each of the cascades of step 330, the process continues to step 390 and renders the receiver geometry. In some embodiment, when rendering the opaque/lighting pass, the results of the analyzing of the shadow receivers may be used to determine the type of pixel shader in the opaque pass. For example, in some embodiments, marked geometry, i.e., receiver geometry that intersects one or more casters, chooses a pixel shader that samples a WB. For other potentially receiving geometry, e.g. geometry not marked during the shadow analyzing process 400, the geometry is not shadowed.

In one or more embodiments, baked shadow integration may be performed according to several methods. In one embodiment, baked shadow may take the form of HDR light maps, HDR vertex based light, etc. These forms of the baked shadow may contribute to the "direct" portion of the lighting equation, to contrast with indirect, bounced or ambient light. In some embodiments, an artist may choose which lights should be shadowable. In some embodiments, indirect light is not shadowed.

In one embodiment, certain receivers within the scene may be shadowed by hidden casters. According to some embodiments, hidden casters are rendered into the shadow map, but do not exist as visual geometry. In one embodiment, some hidden casters may only render on pixels that do not receive baked shadows. In some embodiments, such casters are not included in the same shadow map as those casters that cast on everything. In one embodiment, the hidden casters have their own shadow map and therefore go through a separate set of full screen passes, independent of objects that cast on everything.

FIG. 4 illustrates a method 400 for analyzing shadows accordingly to several embodiments of the present invention. In step 410, a 3D caster grid is constructed. In one embodiment, the caster grid constructed in step 410 comprises a grid from the particular light source point of view that fully encloses the current cascade frustum. In some embodiments, a fixed number of cells may be used in the grid. For example, in one embodiment, an 8×8 grid may be used. In other embodiments, other grid sizes may be used.

In one embodiment, for each light source, for each category, for each cascade a 3D caster grid is constructed. In one embodiment, before beginning the process in step 410, for each category and caster for each light source, all possible casters and receivers are collected. In one embodiment, the set of all casters and receivers may be referred to as a shadowing set (SS). In a further embodiment, before beginning the process 400, after collection the shadowing set, for each of the casters and/or receivers within the shadowing set, the per draw call bounding information for the caster and receivers is collected. In some embodiments, the call bounding information comprises spheres. In alternative embodiments, Axis Aligned Bounding Boxes (AABBs), Oriented Bounding Boxes (OBBs) or other types of bounding information may be used.

Next, in step 415, casters in the shadow set are projected onto the 3D grid using the bounding information collected, and the 3D grid is filled in. In some embodiments, each grid cell may be viewed as an AABB in light space. In one embodiment, where spheres are used as the bounding information, projecting casters will form capsule like bodies.

After the projection, in step 420, each intersected cell is grown to fully encompass the caster. In one embodiment the growth is limited to the actual cell bounds within grid. In one embodiment, during this step, a union of the cell's current bounds and the projected caster's bounds is performed. In such embodiment, any part of the union which is outside the cell's maximum boundary within the 3D grid is clipped so that the extents of the cell do not exceed the maximum boundaries. In one embodiment, "union" is similar to an OR function in that it refers to the volume being occupied by only one.

In one embodiment, a receiver only receives a shadow if a projected caster intersects that receiver. In some embodiments, the 3D caster grid is used to avoid testing every caster individually against each receiver to determine if the caster hits the receiver. Instead, in some embodiments, the 3D caster grid may be used to optimize the test for speed.

Next, in step 425, a second 3D grid, the receiver grid, is constructed. In one embodiment, the 3D receiver grid covers the same volume as the caster grid. In one or more embodiments, the bounding information of the receivers within the shadow set is used to construct the 3D grid. In some embodiments, the receiver, unlike the caster, does not project. Therefore, non-projected bounding volumes are used for the receivers within the receiver grid. In one embodiment, to optimize the construction of the caster grid, it is not necessary to fill in cells that are not touched by any casters in the caster grid.

In step 430, cell by cell, the receiver grid is intersected with the caster grid to determine if any of the receivers intersect the caster grid. If it is determined that the any receivers intersect the caster grid, in step 435, the receiver is marked for later rendering, and the process moves to step 440. In one embodiment, intersecting the cells of the receiver grid with the caster grid is similar to an AND function in that it determines that the volume is shared by both. As such, in some embodiments, if a specific receiver touches only empty caster grid cells, the there is no intersection, and the specific receiver is thrown away. Accordingly, in such embodiments, receivers that do not receive shadows for the specific light source, cascade and category are thrown out. Alternatively, if a specific receiver has an intersection with a caster grid cell, then that receiver is marked for rendering. In one embodiment, the information is used to develop a list of receivers for later rendering into a shadow map. In one embodiment, for example, receivers are marked for to use the shadowing pixel shader in the opaque pass if it is determined that the receiver intersects with the caster grid cell for any of the cascades, even if only one cascade. In some embodiments, those receivers that are not marked during this step may be assumed to not be shadowed by the casters and therefore may choose a pixel shader that does not sample the WB.

In step 440 the cells covered by each receiver that intersects the caster grid as determined in step 430, are grown. After completing step 440, i.e., after all of the receivers within the receiver grid have been intersected with the caster grid and the intersecting receivers have been marked for rendering and the respective cells covering the receivers have been grown, the process then continues onto step 450.

In step 450, according to some embodiments, the caster grid and the receiver grid are intersected cell by cell to construct a new intersection grid, which is the intersection of the caster and receiver grids. In one embodiment, the 3D intersection grid covers the same volume as the caster grid and receiver grid. In one embodiment, in step 455 it is determined if any casters intersect this new final intersection grid.

If in step 455, if it is determined that a caster intersects the new final intersection grid, the caster is marked for rendering in step 460. In one embodiment, a caster may be marked for later rendering if there is any intersection at all. In some embodiments, if a particular caster does not intersect the final intersection grid, it may be concluded that the caster does not touch any receivers and therefore the caster may be thrown out. Accordingly, in some embodiments, in step 460, a list of casters for later rendering into shadow map is developed.

Next, in step 465, the screen is apportioned into a number of 2D grids. In some embodiments, an 8×8 grid may be used, however it should be understood that any size grid may be used, for example, based on system or project requirement. The 2D screen space is then projected in 3D, which represents the volume of space that the 2D grid cells project over based on the current view projection being employed. In one embodiment, the 2D grid is projected such that each cell of the 2D grid forms a unique 3D frustum.

Next, in step 470, according to several embodiments, for each screen grid cell projected into a unique frustum, it is determined if there are any 3D cascade cells within that frustum. That is, it is determined if there are any intersections. In one embodiment, if it is determined that there are no 3D cascade cells within the frustum, i.e., screen grid, then that 2D cell is determined as not receiving any shadows for the current light source, category and cascade combination. In one embodiment, upon determining that there is no intersection, the process moves to step 475 and tests the next cell within the grid, such that the process is repeated for all cells of the 2D screen grid.

If it is determined that there are intersections, i.e. there are 3D cascade cells within the frustum, then in step 480, a 3D AABB intersection volume is determined. In some embodiments, depth information may be determined from the 3D grid. This information may be used, according to some embodiments, by the hardware (HW) depth bounds functionality to exclude pixels based on their z-buffer depths. Accordingly, the 3D grid is used to both narrow the 2D area that receives shadows as well as narrow the depth of the corresponding 3D volume. In several embodiments, accordingly, only pixels that are in the identified 2D areas and within the depth range are drawn. In one embodiment, this leads to many pixels being thrown away.

Figure 5:
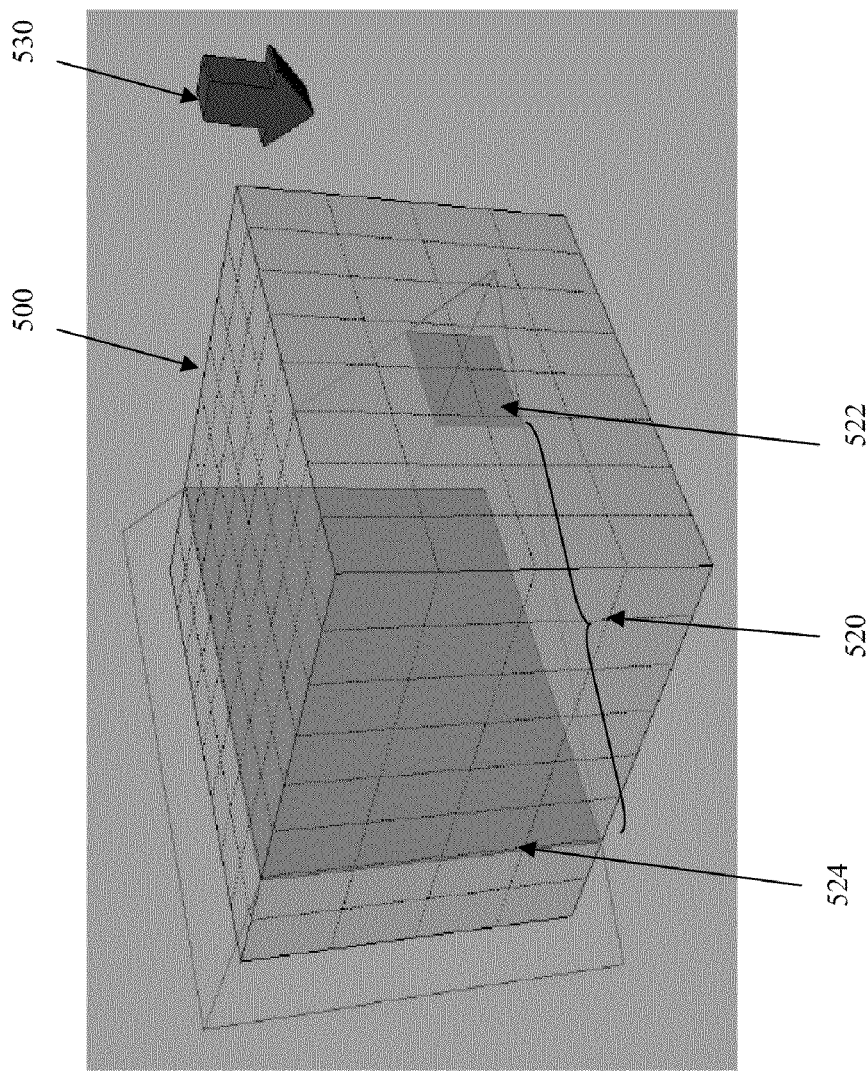
FIG. 5 illustrates an exemplary 3D Grid according to several embodiments of the present invention.

FIG. 5 illustrates an exemplary 3D grid or shadow volume 500, enclosing the cascade frustum 520. A cascade near plane 522 and far plane 524 are illustrated to define the boundaries of the cascade frustum 520. In this exemplary embodiment, the direction of the light source is illustrated by an arrow 530. As seen, in this exemplary embodiment, for demonstration purposes, the light source direction is straight down. The shadow volume is partitioned into a grid. In this exemplary embodiment, the shadow volume 500 is partitioned and the shadow's X and Y coordinates are in the same plane as the near plane of the 3D shadow volume, and Z is moving away from the shadow volume near plane, 3D box illustrated in FIG. 5. As the shadow volume covers at least the portion of the scene encompassing a cascade, for illustrative purposes, it is assumed that the scene comprises both casters and receivers, such that there are both casters and receivers inside this volume. The 3D volume is analyzed by the process 400 to determine which casters cast shadows on which receivers from the scene. In one embodiment, after this information is gathered, the process 400 then moves to a 2D screen grid to determine how everything should appear in the viewer's perspective.

Figure 6:
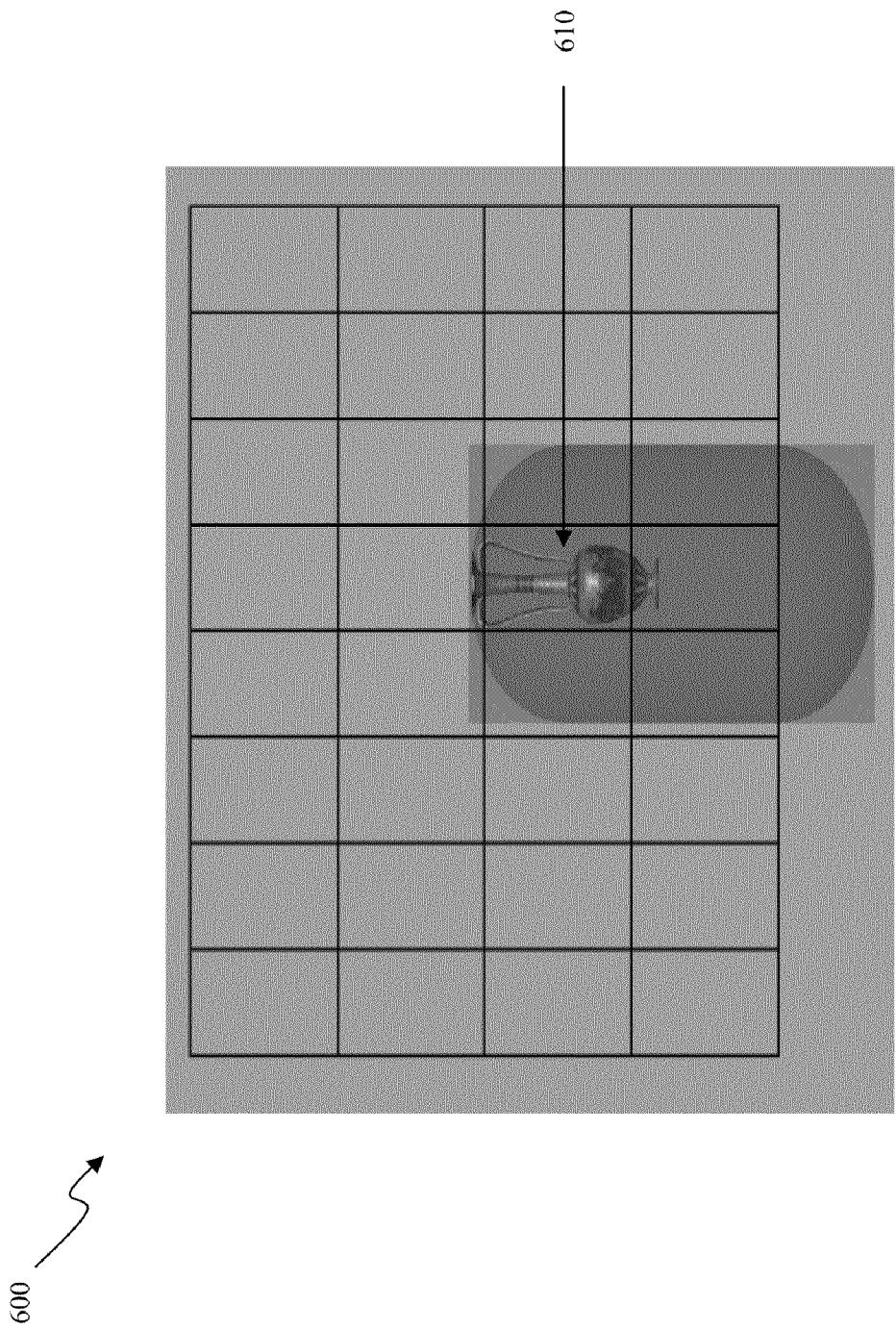
FIG. 6 illustrates an exemplary 3D caster grid according to several embodiments of the present invention.

FIG. 6 illustrates an exemplary caster grid as seen from the side. For illustration purposes the frustum is not shown, however, the frustum if shown would be on the right directed towards the left. In one embodiment the caster grid covers the same volume as the 3D grid 500 of FIG. 5. As seen in FIG. 6 the particular grid only comprises one caster 610, according to the shadow set information. The caster is illustrated as having been placed in the grid according to the bounding information and projected. The intersecting cells of the grid have been grown. In one embodiment, the caster grid of FIG. 6 is a result of steps 410-420 of process 400.

Figure 7:
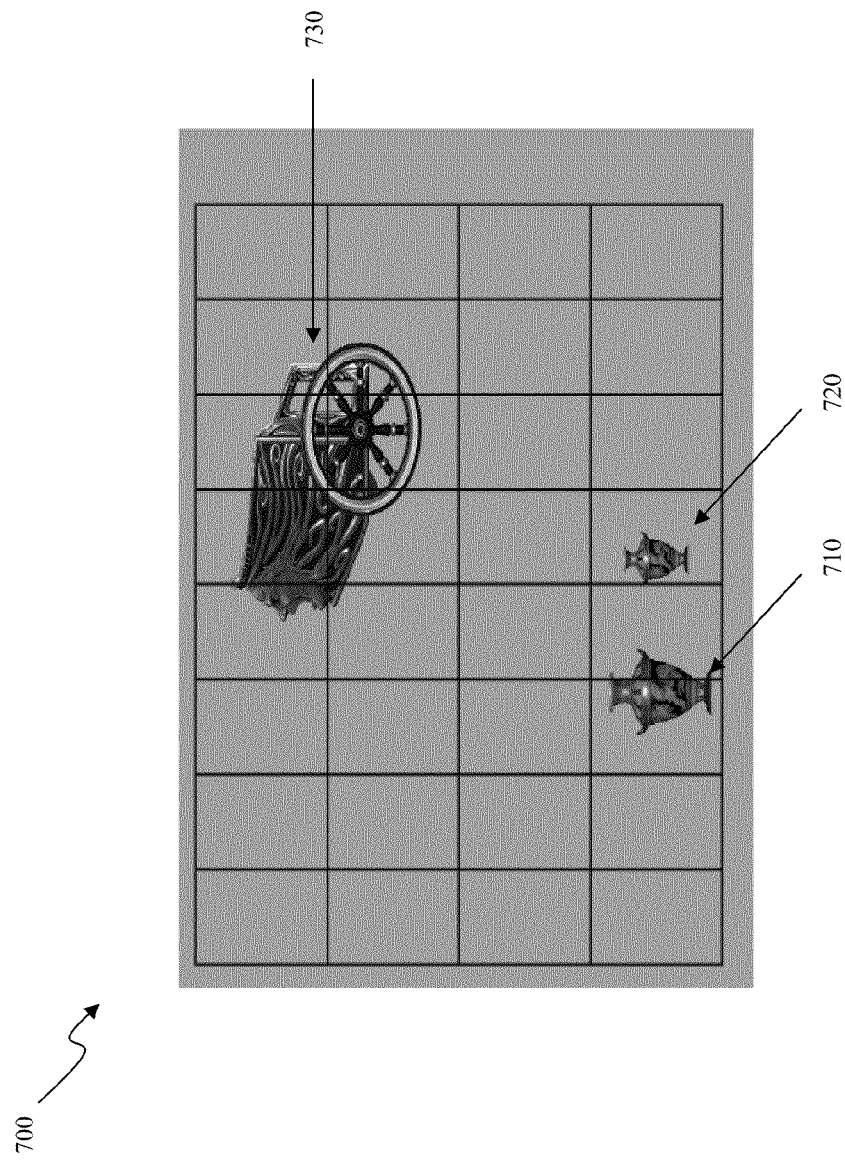
FIG. 7 illustrates an exemplary 3D receiver grid according to several embodiments of the present invention.

FIG. 7 illustrates an exemplary receiver grid according to one or more embodiments of the present invention from the side. The 3D grid of FIG. 7 covers the same 3D volume as the 3D caster grid 500. In one embodiment, the receiver grid covers the shadow volume 500 illustrated in FIG. 5. FIG. 7 illustrates 3 receivers 710, 720 and 730 within the 3D grid, according to information from the shadowing set gathered. In some embodiments, at render time the receivers only exist as pixels in the zbuffer, however, according to one embodiment, the system will have bounding information available for the receivers. In one embodiment, the receivers do not project.

Figure 8:
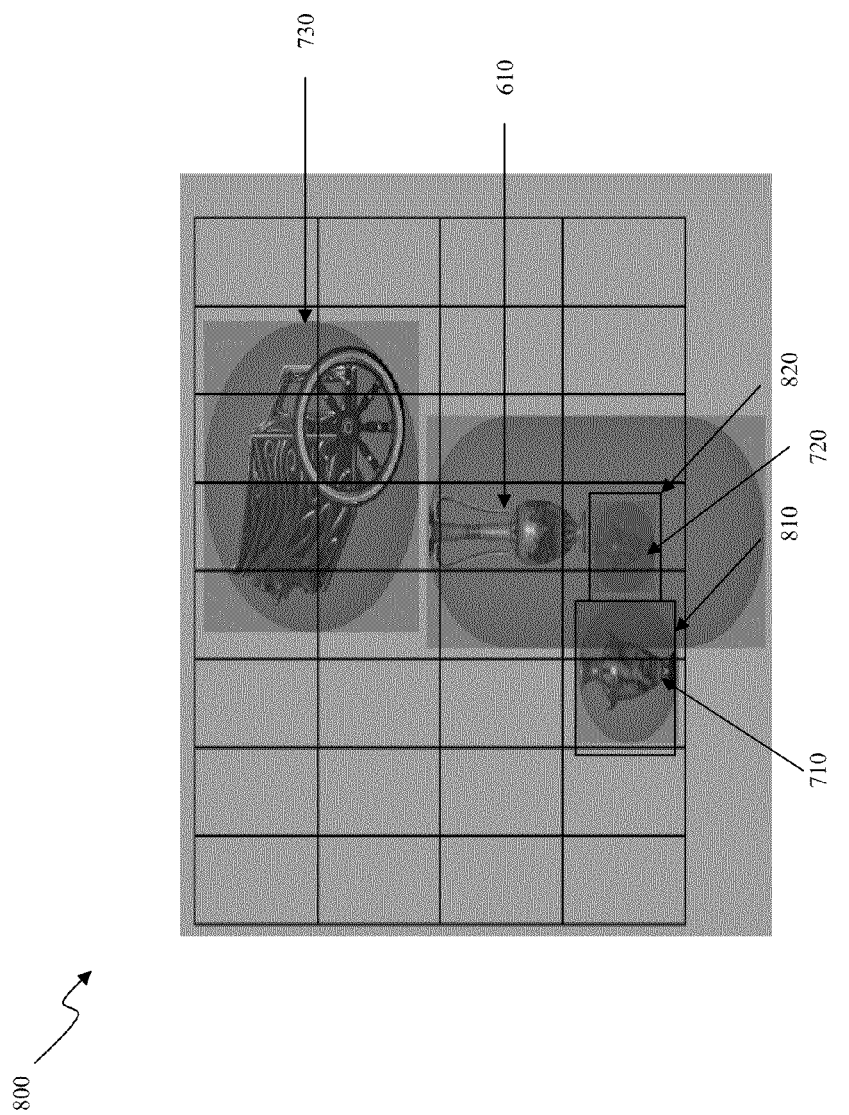
FIG. 8 illustrates an exemplary 3D intersection grid according to several embodiments of the present invention.

FIG. 8 illustrates the intersecting the receivers with the projected casters. As is seen, receivers 710 and 720 intersect with the caster 610, but receiver 730 does not intersect with any casters. In some embodiments, the system generates an AABB of the intersection of what the caster covers and the receivers, i.e. boxes 810 and 820.

Figure 9:
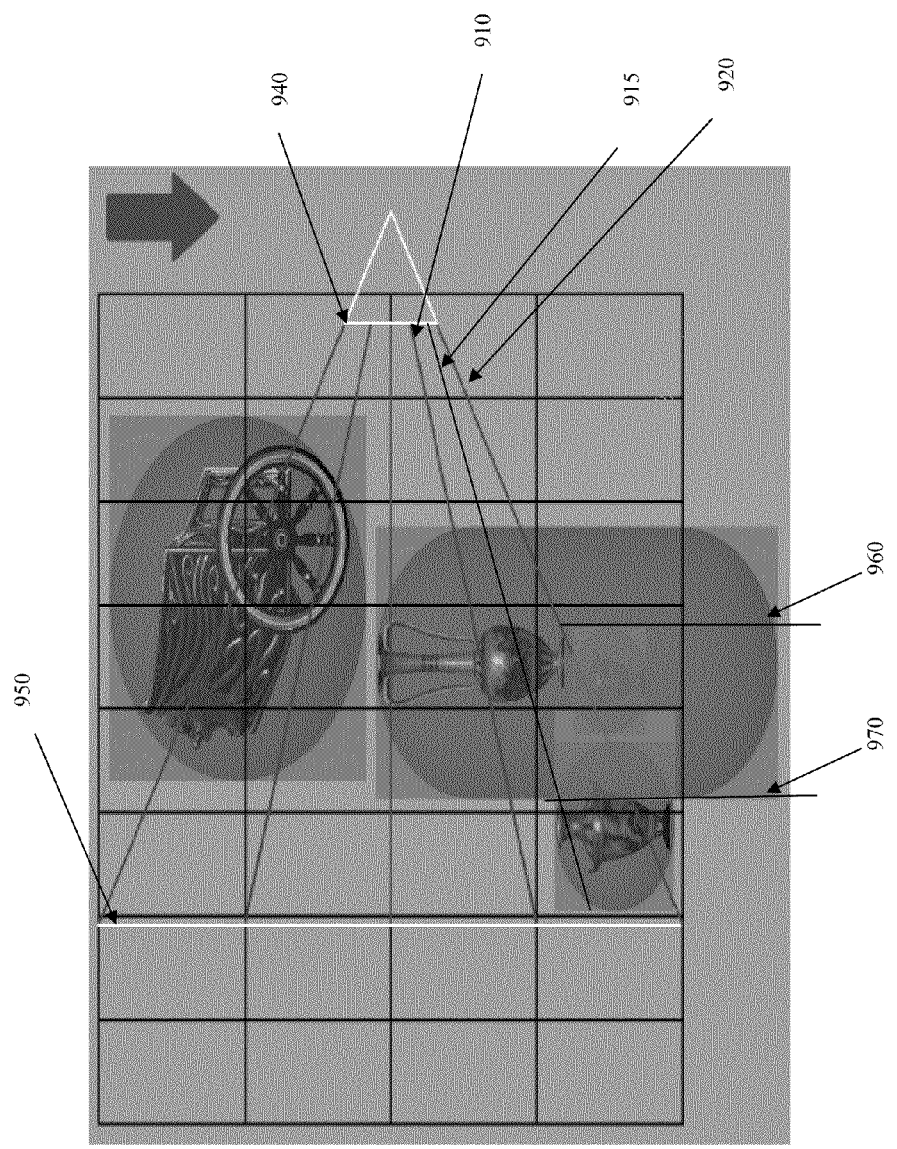
FIG. 9 illustrates a 2D screen grid being intersected with the 3D intersection grid according to several embodiments of the present invention.

FIG. 9 illustrates the 2D grid being intersected with the 3D intersection grid. The lower lines 910 and 920 of FIG. 9 represent the projection of a 2D screen space cell in 3D. In one embodiment, the space between lines 910 and 920 represents the volume of space that the 2D cell can see within the current cascade. According to some embodiments, each cell of the 3D intersection grid is tested against this space. In some embodiments, this comprises intersecting the 3D grid with the 2D projected frustum. Further, based on the intersection, the depth bounds for the particular 2D cell may be further determined. For example, as seen in FIG. 9, the number of pixels that have to be drawn is reduced by more than half at least along the Y direction as can be seen through the side view of the 3D grid. That is, the process may determine where the 3D cell AABBs intersect the 2D projected frustum. In this exemplary embodiment, the 2D cell area to be rendered is reduced from the area covered by lines 910 to 920 to the area between lines 915 and 920. Further, by adjusting the depth bounds to the bounds of the volume at which the 3D grid and the 2D projection intersect, the depth bounds are reduced from the entire length of the frustum, i.e. 940 and 950, to the new bounds 960 and 970.

The above methods and processes provides an optimized rendering flow with a shadow rendering process where the number of passes and sampling is reduced, and therefore shadows are provided at an optimal resolution while maintaining a desirable rendering speed.

FIGS. 10-13 describe an alternative process for rendering shadows. Specifically, some of the embodiments of the present invention provide one or more methods for rendering shadows in 3D computer graphics in a manner that reduces aliasing artifacts and that lends a soft appearance to the shadows. For example, in some embodiments the present invention provides a series of methods for rendering image based projected shadows with multiple depth aware blurs, a purpose of which includes reducing aliasing artifacts and lending a soft appearance to shadows rendered into a multisampled anti-aliased buffer.

Figure 10:
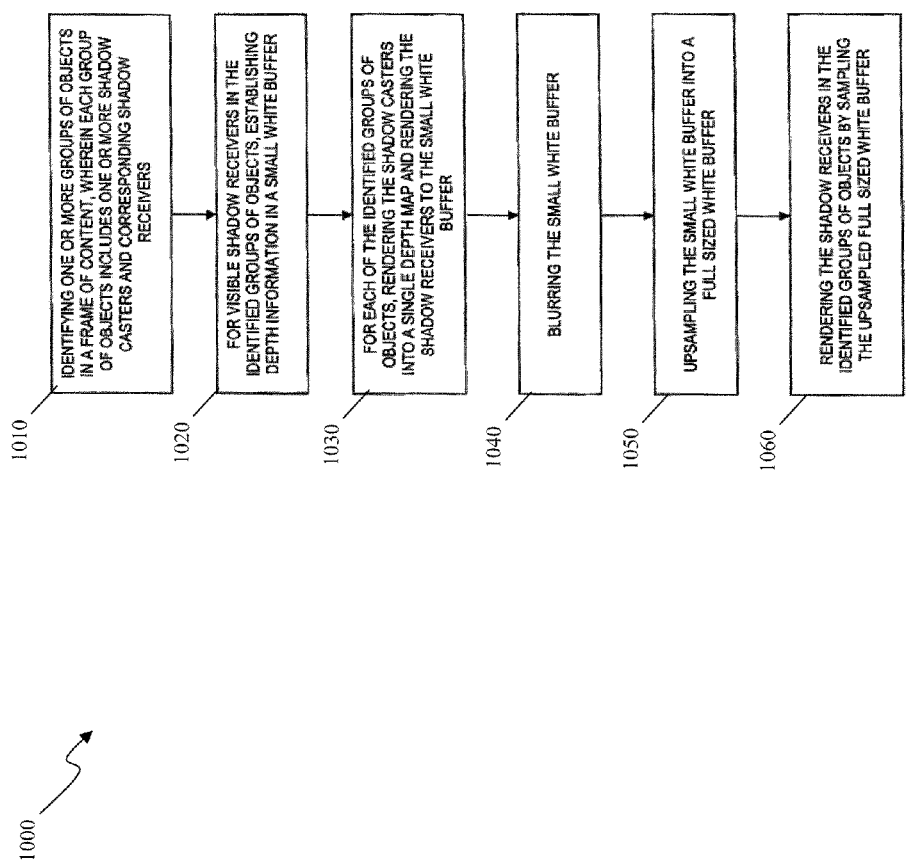
FIG. 10 illustrates a flow diagram of an alternative method of rendering shadows within a scene according to several embodiments of the present invention.

Referring to FIG. 10, there is illustrated an example of a method 1000 in accordance with an embodiment of the present invention. The method 1000 may be used in 3D computer graphics for rendering image based projected shadows with multiple depth aware blurs. In some embodiments, the method 1000 may be used for rendering such shadows in real time. The method 1000 may be applied to any type of content, such as for example video games, both online and offline game types, simulations, other types of videos, etc.

The method 1000 begins in step 1010 where a frame of the content is analyzed. Specifically, one or more groups of objects in the frame are identified such that each group of objects includes one or more shadow casters and corresponding shadow receivers. In one embodiment for example, the frame of content is similar to frame 100 illustrated in FIG. 1.

In step 1020, depth information for visible shadow receivers in the identified groups of objects is established in a small white buffer. In some embodiments, this buffer is actually composed of a depth buffer and a color buffer. The small white buffer may be referred to as a deferred buffer. In some embodiments, this step may be performed by rendering a depth prepass to the small white buffer. In some embodiments, however, it is not necessary to render receivers into the white buffer if a depth prepass has already been performed at the full resolution. In this case, the small white buffer's depth may be constructed by downsampling the larger depth buffer. Point sampling the large buffer is sufficient.

In step 1030, for each of the identified groups of casters/receivers pairs, the shadow casters are rendered into a single depth map, and if necessary, the shadow receivers are rendered to the small white buffer.

In step 1040, the small white buffer is blurred. In some embodiments a low resolution blur may be used.

In step 1050, the small white buffer is upsampled into a full sized white buffer. That is, the small white buffer is made bigger. In some embodiments, the upsampling technique may use depth values or information as a metric. That is, in some embodiments the upsampling comprises using depth information as a metric. A technique for performing the upsampling that may be used in some embodiments will be described below. The upsampling technique described below upsamples the deferred buffer in a manner that is can preserve more detail than simply using a box filter. In some embodiments, the upsampling technique described below may comprise features of bilateral upsampling techniques.

In step 1060, the shadow receivers in the identified groups of objects are rendered by sampling the upsampled full sized white buffer.

Figure 11:
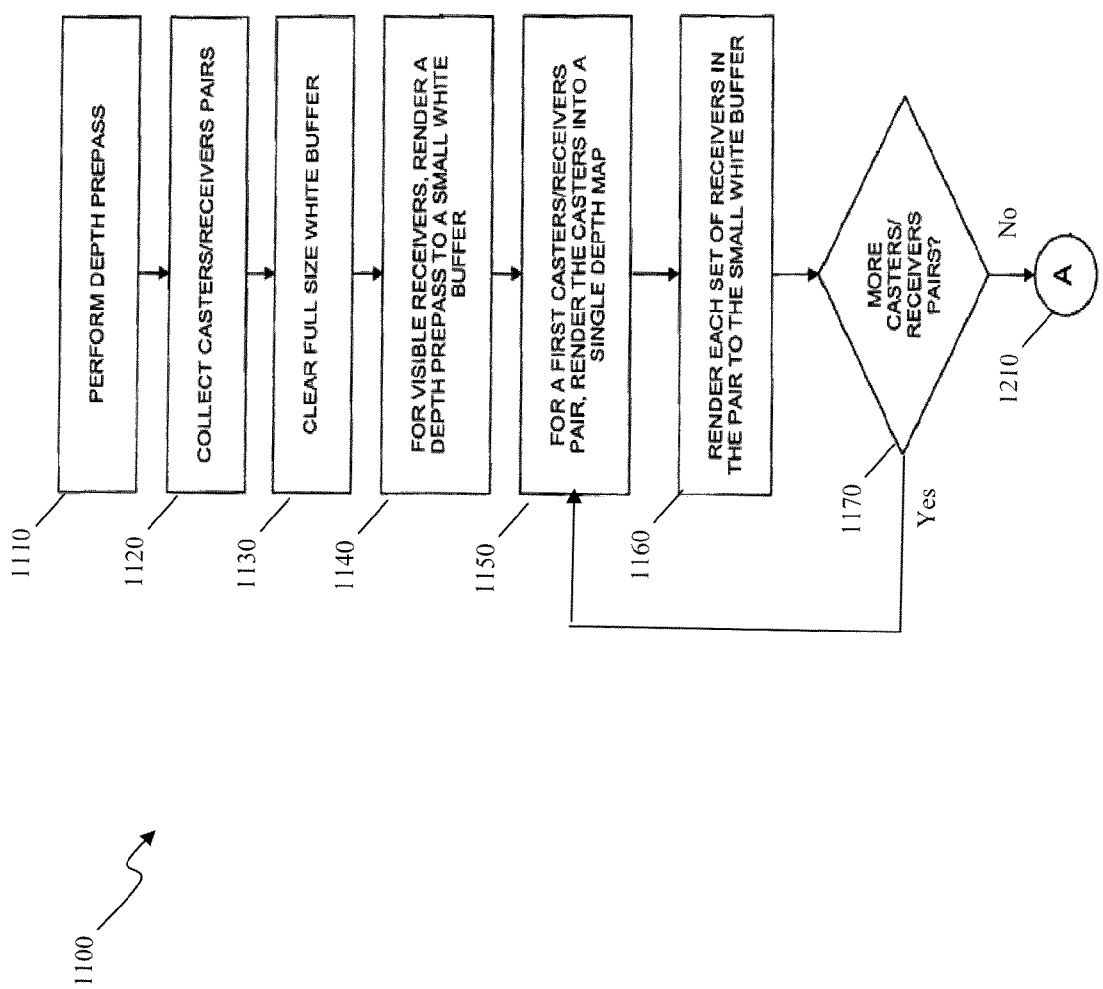
FIGS. 11 and 12 illustrate a more detailed flow diagram of an alternative method for rendering shadows within a scene, according to several embodiments of the present invention.
Figure 12:
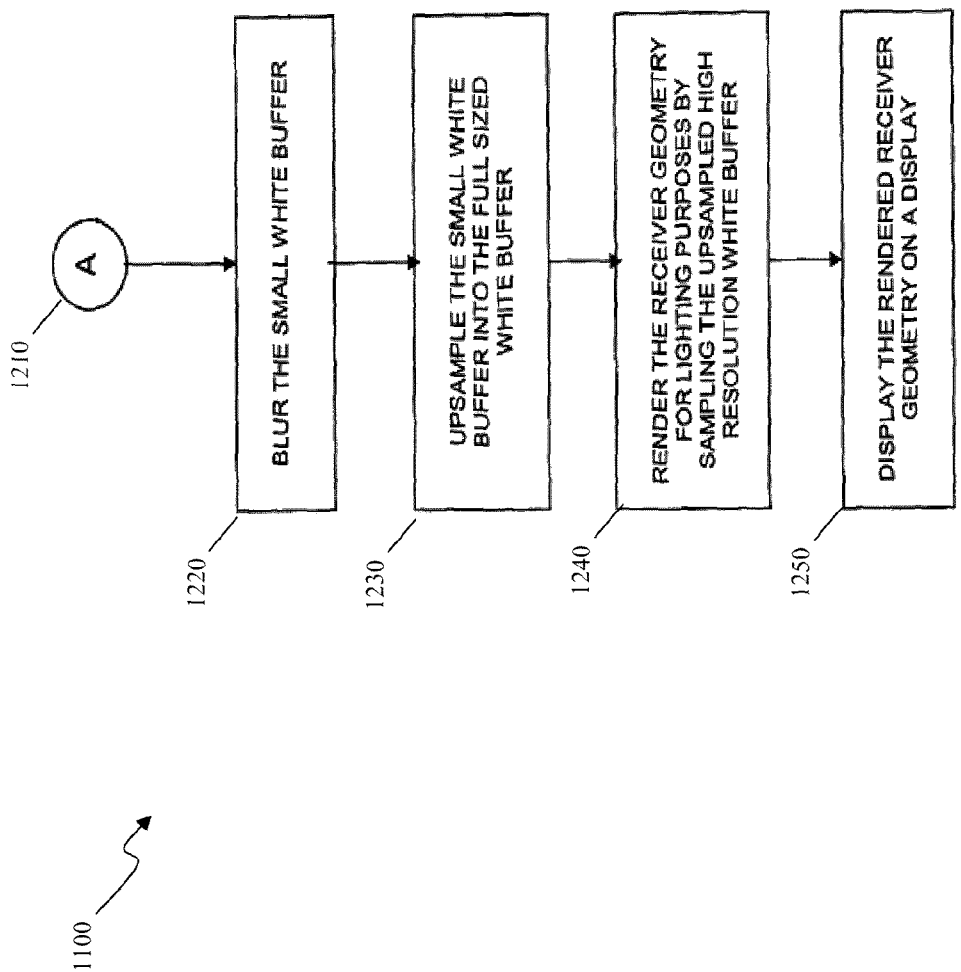

An embodiment will now be described in greater detail with reference to FIGS. 11 and 12. Specifically, there is a method 1100 in accordance with an embodiment of the present invention. The method 1100 may be used in 3D computer graphics for rendering image based projected shadows with multiple depth aware blurs, which helps to reduce aliasing artifacts and lend a soft appearance to shadows rendered into a multisampled anti-aliased buffer. In some embodiments, the method 1100 may be used for rendering such shadows in real time. The method 1100 may be applied to any type of content, such as for example video games, both online and offline game types, simulations, other types of videos, etc.

In step 1110, depth is cleared and a depth prepass is performed with all opaque and cutout geometry in the content.

In step 1120, for every frame of the content, all objects or subsets of objects are gathered into collections of shadow casters/shadow receivers pairs for those active shadowing lights affecting visible receiver geometry. Thus, the shadow casters/receivers pairs of objects in the frame include one or more shadow casters and corresponding shadow receivers. In the discussion herein, the term "shadow casters" may be simplified to "casters", and the term "shadow receivers" may be simplified to "receivers".

In step 1130, a "white buffer" is cleared and the depth is set to its default value, and the color is set to full intensity (white). This buffer is referred to herein as the full sized white buffer.

In step 1140, only for all visible receivers selected previously, another depth prepass is rendered, but to a much smaller "white" buffer. This buffer is referred to herein as the small white buffer. Alternatively, it is also sufficient to downsample the depths from the full sized white buffer.

Next, for each casters/receivers pair, the casters for the pair are rendered into a single depth map. Then, each set of receivers in the pair are rendered to the small white buffer. Alternatively, downsampled depth values from the small buffer may be used. These steps are illustrated by steps 1150, 1160 and 1170. Namely, in step 1150 the casters in a first casters/receivers pair are rendered into a single depth map. Then in step 1160, each set of receivers in the pair are rendered to the small white buffer.

In some embodiments, step 1160 of rendering each set of receivers in the pair to the small white buffer may be performed using an appropriate amount of filtering samples. By way of example, in some embodiments Percentage Closer Filtering (PCF) may be used. The sample width may be adjusted based on the derivative of the depth as well as the derivatives of the shadow maps sampling texture coordinates. Optionally, in some embodiments, a Poisson sampling distribution may be used to mask high frequency "steps" resulting from undersampling the caster depth map. In some embodiments, the shadowed sample may be written into the small white buffer using a MIN blend mode.

In step 1170, the system determines whether or not there are any more casters/receivers pairs. If so, steps 1150 and 1160 are repeated. Steps 1150 and 1150 are repeated for each casters/receivers pairs. Once step 1170 determines that there are no more casters/receivers pairs, then the process flow proceeds through connector 1210 and on to step 1220 (FIG. 12).

In step 1220, the small white buffer is blurred. In some embodiments, the small white buffer may be blurred with a depth aware low pass filter. In some embodiments, for those samples that are too far in terms of depth distance from the sample point, their influence is not included in the blur. That is, in some embodiments, the blurring comprises not including an influence of samples having a depth that is beyond a certain distance from a sample point. In some embodiments, for those samples within an acceptable depth distance, they are weighted based on distance and include in the filter. That is, in some embodiments, the blurring comprises weighting based on distance each sample having a depth that is within a certain distance from a sample point. Again, the word "far" refers to depth distance.

Blurring the small white buffer is effectively performing a low resolution blur. The small white buffer is blurred with itself, and in some embodiments the blur is based on the relative depth values of the pixels. That is, the Z values (or depth values) are taken into account in performing the blur. In some embodiments, an in-place blur is performed by deciding which pixels to blur based on their relative depth values. Thus, depth information or values are used as a metric. In some embodiments, the blur performed on the small white buffer may be a bilateral blur.

Taking the Z value differences between the pixels in the small white buffer into account helps to preserve detail. This is because the Z value differences are used to determine how much influence a neighboring pixel will provide in the blur, that is how much of a neighboring pixel to add in. In some embodiments, if the Z values of neighboring pixels are similar (i.e. the Z value difference is small), then the neighboring pixels will be used to provide an influence in the blur. But if the Z values of neighboring pixels are very different (i.e. the Z value difference is large), then the influence of the neighboring pixel will not be used in the blur. The Z value difference may be large if, for example, a shadow boundary lies between the two pixels. In this case, not using the influence of the pixel in the blur helps to preserve detail because the shadow boundary will remain sharp and not be smudged by the blur. Performing an in-place blur on the small white buffer helps to get smooth changes in shadows. Thus, using depth information or values as a metric helps to determine how much influence neighboring pixels will have in the blur. In some embodiment, pixels are effectively thrown out that are too different in depth. This way, pixels are only smudged together when it makes sense to smudge them together. In some embodiments, the blur may be a bilateral blur.

In step 1230, the small white buffer is upsampled into the full sized white buffer. In some embodiments, the small white buffer may be upsampled into the full sized white buffer using the high resolution depth information stored in the first depth prepass (e.g. step 1110) to weight each of a number of "bilinear" low resolution samples. In some embodiments, the small white buffer may be upsampled into the full sized white buffer using the high resolution depth information stored in the first depth prepass (e.g. step 1110) to weight each of, for example, four "bilinear" low resolution samples.

Similar to the previous blur in step 1220, in some embodiments of step 1230, the weights are set to zero for each sample whose depth is too far from the high resolution sample point's depth. That is, in some embodiments, the upsampling comprises setting weights to zero for each sample having a depth that is beyond a certain distance from a high resolution sample point's depth. In some embodiments, for those samples within an acceptable distance, they are weighted based on distance and included in the filter. That is, in some embodiments, the upsampling comprises weighting based on distance each sample having a depth that is within a certain distance from a high resolution sample point's depth. In some embodiments, if no samples are close enough, then only the bilinear weight is used. In some embodiments, this kind of filter may include techniques used in a bilateral filter. In some embodiments, the upsampling may comprise bilateral upsampling.

An example embodiment for step 1230 of performing the upsampling will be further described below.

In step 1240, the receiver geometry is rendered for lighting purposes. In some embodiments, the receiver geometry is rendered for lighting purposes by sampling the now upsampled high resolution white buffer. That is, in some embodiments, the shadow receivers are rendered by sampling the upsampled full sized white buffer.

In some embodiments, step 1240 may be performed by using multisample anti-aliasing (MSAA). If using MSAA, fewer samples will run than exist in the high resolution white buffer. In this case, in some embodiments, the instant depth may be taken and compared to the depths contained in the high resolution white buffer. If all samples are roughly the same distance from the instant depth, then all high resolution white buffer samples may be evenly weighted and the aggregate shadow value used to attenuate (shadow) the contribution of any dynamic lights that are marked to gather shadows from the white buffer. In some embodiments, any samples whose depths are too far from the closest white buffer depth are discarded, and the remaining samples are used to form an aggregate shadow value for attenuation purposes.

In step 1250, the rendered shadow receivers may be displayed on a display.

Figure 13:
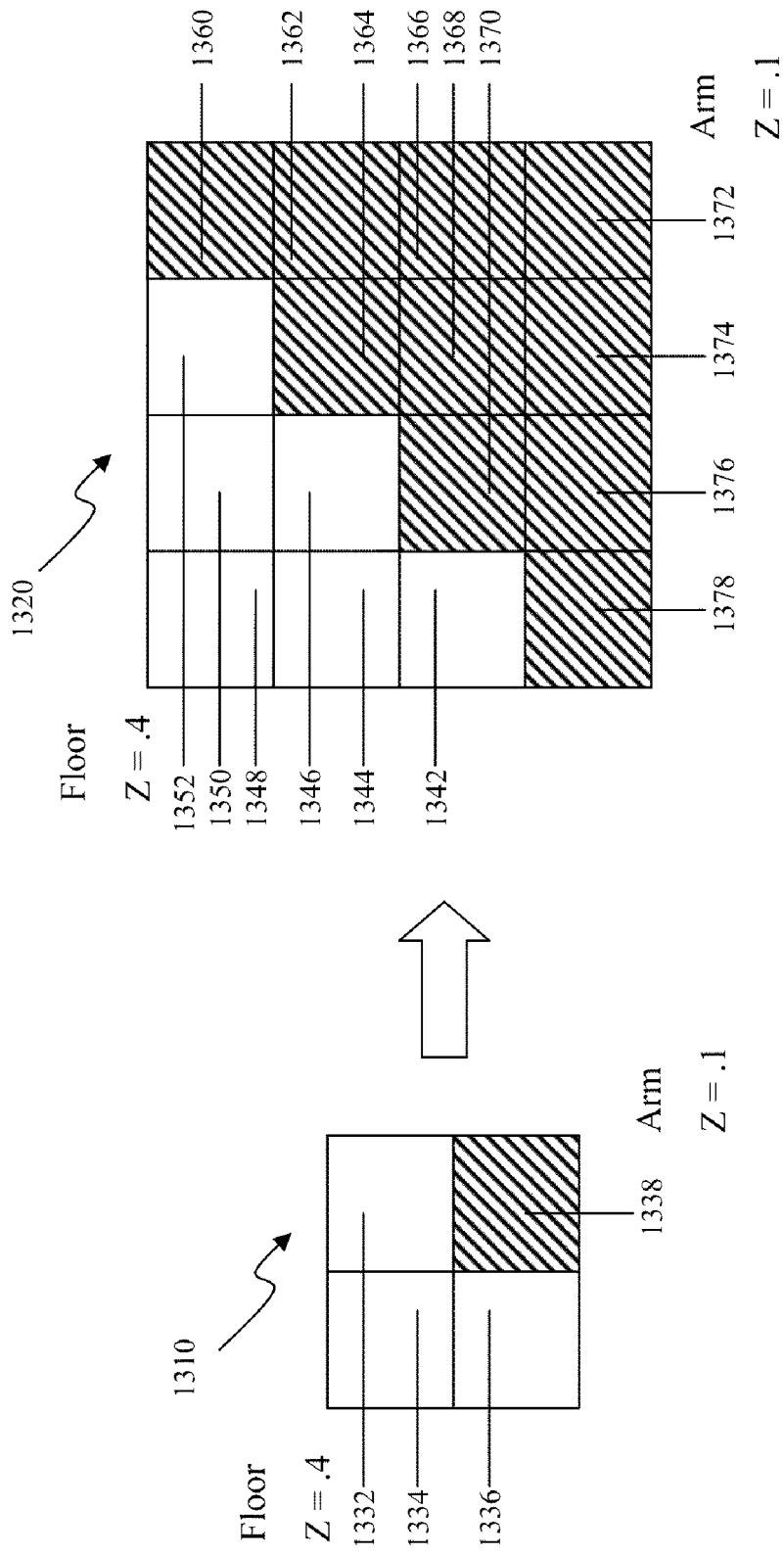
FIG. 13 illustrates a small white buffer and a full sized white buffer according to several embodiments of the present invention.

An example embodiment of step 1230 in which the small white buffer is upsampled into the full sized white buffer will now be described. FIG. 13 illustrates a small white buffer 1310 that is to be upsampled into a full sized white buffer 1320. As mentioned above, the small white buffer 1310 may be referred to as a deferred buffer. The process of upsampling is sometimes referred to as "zooming up" the small white buffer 1310 to the full sized white buffer 1320, or making the small buffer into a big buffer. Portion of pixels of small buffer map to pixels in big buffer. In this example, the upsampling is going from 2×2 (i.e. 4 pixels) to 4×4 (i.e. 16 pixels). It should be understood, however, that the methods and techniques described herein may be applied to upsample any size small buffer to any size full size buffer.

One way to perform upsampling is to use a box filter to zoom up the small white buffer 1310. With this technique, for each pixel in the full sized white buffer 1320, weights are assigned to the pixels in the small white buffer 1310. The weights assigned to the pixels in the small white buffer 1310 determine the amount of influence that the those pixels will have on the particular pixel in the full sized white buffer 1320. The weights assigned to the pixels in the small white buffer 1310 will typically sum up to one.

One problem with the box filter technique is that it deals only with the color of the pixels and does not take into account the depth values of the pixels. This can lead to the undesirable result of a pixel in the small white buffer 1310 providing color influence when it really should not because it is at a much different depth than the pixel in the full sized white buffer 404 that it is influencing.

For example, the cross-hatched pixels 1360, 1362, 1364, 1366, 1368, 1370, 1372, 1374, 1376, and 1378 in the full sized white buffer 1320 may represent a person's arm. Similarly, the cross-hatched pixel 1338 in the small white buffer 402 represents the person's arm at a lower resolution. The person's arm may be close to the camera, and so the Z value (i.e. the depth) of those pixels may be approximately Z=0.1 (where the camera is Z=0.0). The remaining pixels 1342, 1344, 1346, 1348, 1350, and 1352 in the full sized white buffer 1320, and the remaining pixels 1332, 1334 and 1336 in the small white buffer 1310, may represent the floor. The floor is farther away (more distant) from the camera, and so the Z value (i.e. the depth) of those pixels may be approximately Z=0.4.

The box filter technique would cause pixel 1334 in the small white buffer 1310 to influence the color of pixel 1370 in the full sized white buffer 1320. However, this is undesirable because pixel 1334 is clearly the floor, and pixel 1370 is clearly the person's arm. Similarly, the box filter technique would cause pixel 1338 in the small white buffer 1310 to influence the color of pixel 1348 in the full sized white buffer 1320. However, this is undesirable because pixel 1338 is clearly the person's arm, and pixel 1348 is clearly the floor.

In order to avoid these disadvantages, embodiments of the present invention use depth (i.e. Z values) as a metric. That is, in some embodiments, the metric that is used is depth. For example, in some embodiments, pixels in the small white buffer 1310 are not used to influence pixels in the full sized white buffer 1320 that have a much different Z value. Namely, depth information is used to throw out certain pixel weights because they have bad information. The pixel weights to throw out are identified based on depth information (i.e. Z values). In some embodiments, the depth values of the pixels in the full sized white buffer 1320 may be determined by taking the proportionate depth amount of the pixels in the small white buffer 1310. That is, for each of the sixteen pixels in the full sized white buffer 1320, take the proportionate depth amount of the four pixels in the small white buffer 1310.

In some embodiments of the present invention, the step of upsampling generally involves looking at the depth value, constructing what the weights would be, and then throwing out values or re-weighting values based on differences in depth. Thus, this is a conditional process because it throws out some values. A determination is made for each pixel as to whether the high resolution depth matches the low resolution depth. If not, the influence of the pixel is thrown out or reweighted.

For example, in some embodiments, the step of upsampling may involve constructing what the pixel weights for the pixels in the small white buffer 1310 would be for a particular pixel in the full sized white buffer 1320. Then, the depth values (i.e. Z values) for the pixels in the small white buffer 1310 are compared to the depth value of the particular pixel in the full sized white buffer 404. This essentially determines whether the high resolution depth matches the low resolution depth. For pixels in the small white buffer 1310 where the difference in the depth value is large, the influence of those pixels is either thrown out or re-weighted. This is because those pixels would contribute bad shadow information. Not using the influence of those pixels helps keep the shadow edge straight. Namely, this preserves sharp edges by systematically excluding pixels across the discontinuity from consideration.

Thus, in some embodiments, the pixel weight information is used in the upsampling, unless it is found that the depths vary by more than a certain amount. For pixels where the depths vary by more than a certain amount, the weight information for those pixels is either thrown out, or they are reweighted. Thus, in some embodiments, pixels are thrown out having depths that do not match. That is, they are thrown out based on their Z value. Not using the influence of such pixels, or throwing them out, helps to preserve detail. Detail is preserved because the color of a pixel in the small white buffer 1310 is not used to influence the color of a pixel in the full sized white buffer 1320 having a much different depth. In this way, depth information or values (i.e. Z values) are used as a metric. It is noted that the blurring step described above is similar in that depth is also used as a metric.

In some embodiments, the weight of the low resolution samples may be determined as follows. Specifically, a range of Z values may be chosen. That is, a delta Z between the small and large buffer may be chosen to define a tolerance. Pixels that are within the tolerance of Z values may be treated as the same. That is, even if they do not match, they are treated as the same if they are close. A small tolerance may give more detail. A small tolerance may avoid it leaking to something else. In some embodiments, the artist may have control over the tolerance. That is, the artist can change/modify the tolerance. Thus, the tolerance may be used to identify sameness. For pixels in the tolerance, they may be treated the same. In some embodiments, edge pixels may be faded off slowly.

Thus, the upsampling process involves zooming up a small buffer to a big buffer. In some embodiments, the metric of correction is depth. Namely, if pixels are close in depth, then their influence is used in the upsampling. If pixels are not close in depth, then their influence may not be used in the upsampling. As mentioned above, in the illustrated example, the upsampling is going from 2×2 (i.e. 4 pixels) to 4×4 (i.e. 16 pixels). It should be understood, however, that the methods and techniques described herein may be applied to upsample any size small buffer to any size full size buffer. That is, the upsample ratio may vary. In some embodiments, the small white buffer may be chosen to have an aspect ratio similar to the full size white buffer. In general, the larger the small white buffer, the more detail that can be obtained. However, increasing the size of the small white buffer generally increases costs.

In some embodiments, the upsampling (step 1230) may comprise bilateral upsampling, or a bilateral upsample process. For example, in some embodiments, the process of zooming up the deferred buffer may involve bilateral upsampling techniques. In some embodiments, some of the above-described techniques for upsampling may be referred to as a bilateral upsample process. In some embodiments, the techniques may include techniques used in bilateral filtering techniques. A bilateral filtering technique is discussed in the paper entitled "Image-Based Proxy Accumulation for Real-Time Soft Global Illumination", by Peter-Pike Sloan, Naga K. Govindaraju, Derek Nowrouzezahrai, John Snyder, Pacific Graphics 2007, October 2007, the entire contents and disclosure of which is hereby incorporated by reference herein in its entirety.

As has been described, in some embodiments of the present invention there is provided a series of methods for rending shadows, and for rendering image based projected shadows with multiple depth aware blurs, a purpose of which is to reduce aliasing artifacts and lend a soft appearance to shadows rendered into a multisampled anti-aliased buffer. In some embodiments, any of the methods and techniques described above may be used for rendering shadows in real time. In some embodiments, aspects involve the use of a 3D caster and receiver grids, 2D grids, stenciling, cascades, categories, tiled shadow maps, etc. In some embodiments, aspects involve the use of a small white buffer or a deferred buffer, a blurring technique that uses depth as a metric, and an upsample technique that takes the deferred buffer and zooms it up to a large buffer using depth as a metric. In some embodiments, the blurring comprises using depth values to determine whether or not a sample should be used in the blurring. In some embodiments, the upsampling comprises using depth values to determine whether or not a sample should be used in the upsampling.

In some embodiments, the above-described methods and techniques may utilize or be combined with various shadow mapping and/or image based blurring algorithms. For example, in some embodiments, the above-described methods and techniques may include, or be combined with, or involve a synthesis of particular sequences and applications of shadow mapping and image based depth-aware blurring algorithms.

Figure 14:
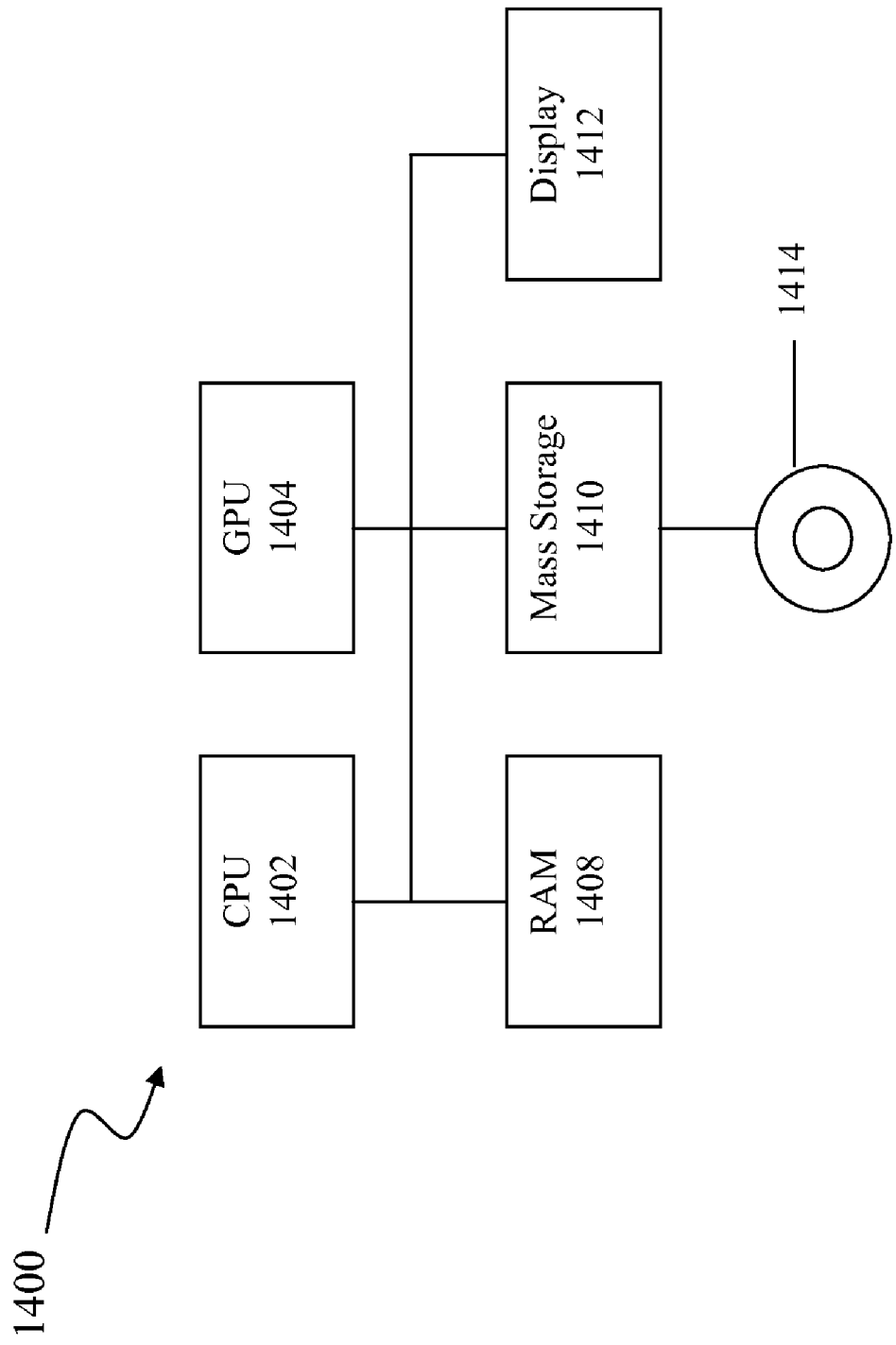
FIG. 14 illustrates an apparatus or system that may be used for any such implementations.

The methods and techniques described herein may be utilized, implemented and/or run on many different types of systems, including for example computers, game consoles, entertainment systems, etc. Referring to FIG. 14, there is illustrated an apparatus or system 1400 that may be used for any such implementations. One or more components of the apparatus or system 1400 may be used for implementing any system or device mentioned above, such as for example any of the above-mentioned computers, game consoles, entertainment systems, etc. However, the use of the apparatus or system 1400 or any portion thereof is certainly not required.

By way of example, the apparatus or system 1400 may include, but is not required to include, a central processing unit (CPU) 1402, a graphics processing unit (GPU) 1404, a random access memory (RAM) 1408, and a mass storage unit 1410, such as a disk drive or other type of memory. The apparatus or system 1400 may be coupled to, or integrated with, any of the other components described herein, such as a display 1412. The apparatus or system 1400 comprises an example of a processor based apparatus or system. The CPU 1402 and/or GPU 1404 may be used to execute or assist in executing the steps of the methods and techniques described herein, and various program content, images, shadows, lighting, etc. may be rendered on the display 1412.

The mass storage unit 1410 may include or comprise any type of computer readable storage or recording medium or media. The computer readable storage or recording medium or media may be fixed in the mass storage unit 1410, or the mass storage unit 1410 may optionally include removable storage media 1414, such as a digital video disk (DVD), Blu-ray disc, compact disk (CD), USB storage device, floppy disk, or other media. By way of example, the mass storage unit 1410 may comprise a disk drive, a hard disk drive, flash memory device, USB storage device, Blu-ray disc drive, DVD drive, CD drive, floppy disk drive, etc. The mass storage unit 1410 or removable storage media 1414 may be used for storing program code or macros that implement the methods and techniques described herein.

Thus, removable storage media 1414 may optionally be used with the mass storage unit 1410, which may be used for storing program code that implements the methods and techniques described herein. However, any of the storage devices, such as the RAM 1408 or mass storage unit 1410, may be used for storing such program code. For example, any of such storage devices may serve as a tangible computer readable storage medium for storing or embodying a computer program for causing a console, system, computer, or other processor based system to execute or perform the steps of any of the methods, code, and/or techniques described herein. Furthermore, any of the storage devices, such as the RAM 1408 or mass storage unit 1410, may be used for storing any needed database(s).

In some embodiments, one or more of the embodiments, methods, approaches, and/or techniques described above may be implemented in a computer program executable by a processor based system. By way of example, such processor based system may comprise the processor based system 1400, or a computer, entertainment system, game console, graphics workstation, etc. Such computer program may be used for executing various steps and/or features of the above-described methods and/or techniques. That is, the computer program may be adapted to cause or configure a processor based system to execute and achieve the functions described above. For example, such computer program may be used for implementing any embodiment of the above-described steps or techniques for rendering shadows and/or rendering image based projected shadows with multiple depth aware blurs. As another example, such computer program may be used for implementing any type of tool or similar utility that uses any one or more of the above described embodiments, methods, approaches, and/or techniques. In some embodiments, the computer program may comprise a video game, role-playing game (RPG), other computer simulation, or system software such as an operating system, BIOS, macro, or other utility. In some embodiments, program code macros, modules, loops, subroutines, etc., within the computer program may be used for executing various steps and/or features of the above-described methods and/or techniques. In some embodiments, the computer program may be stored or embodied on a computer readable storage or recording medium or media, such as any of the computer readable storage or recording medium or media described herein.

In some embodiments, a processor-based apparatus may be used for executing or performing any of the above-described steps, methods, and/or techniques. For example, in some embodiments, the constructing the caster and receiver 3D grids, and/or the projecting and growing steps, may be performed by a processor-based apparatus.

Therefore, in some embodiments the present invention provides a computer program product comprising a medium for embodying a computer program for input to a computer and a computer program embodied in the medium for causing the computer to perform or execute steps comprising any one or more of the steps involved in any one or more of the embodiments, methods, approaches, and/or techniques described herein.

For example, in some embodiments the present invention provides a computer readable storage medium storing one or more computer programs adapted to cause a processor based system to execute steps comprising identifying a set of shadow casters and a set of shadow receivers in a frame of a scene that is lighted by at least a first light source, constructing a first three-dimensional (3D) grid, from the first light source's point of view, that fully encloses a first volume of the scene, comprising one or more shadow casters of the set of shadow casters that fall within the first volume of the scene, projecting each of the one or more shadow casters to generate one or more projected shadow casters, growing each cell of the first 3D grid that includes at least a portion of the one or more projected casters, constructing a second three-dimensional (3D) grid, from the first light source's point of view, that fully encloses the first volume of the scene, comprising one or more shadow receivers of the set of shadow receivers that fall within the first volume of the scene, growing each cell of the second 3D grid that includes at least a portion of at least one of the one or more shadow receivers and for which a corresponding cell of the first 3D grid has been grown, marking for rendering each shadow receiver for which a cell of the second 3D grid has been grown, forming a third 3D grid by intersecting the first 3D grid with the second 3D grid such that the third 3D grid comprises the grown cells of the first grid and the grown cells of the second grid that intersect and marking for rendering into a shadow map each shadow caster that intersects the third 3D grid.

In another embodiment, there is provided a computer readable storage medium storing one or more computer programs adapted to cause a processor based system to execute steps comprising: identifying one or more shadow casters and corresponding shadow receivers in a frame of a scene that is lighted by at least a first light source; constructing a first three-dimensional (3D) grid, from the first light source's point of view, that fully encloses a first volume of the scene; projecting each shadow caster that falls within the first 3D grid; growing each cell of the first 3D grid that includes at least a portion of a projected shadow caster; constructing a second three-dimensional (3D) grid, from the first light source's point of view, that fully encloses the first volume of the scene; growing each cell of the second 3D grid that includes at least a portion of a shadow receiver and for which a corresponding cell of the first 3D grid has been grown; forming a third 3D grid by intersecting the first 3D grid with the second 3D grid; and marking for rendering into a shadow map each shadow caster that intersects the third 3D grid.

As another example, in some embodiments the present invention provides a computer readable storage medium storing one or more computer programs adapted to cause a processor based system to execute steps comprising: identifying one or more groups of objects in a frame of content, wherein each group of objects includes one or more shadow casters and corresponding shadow receivers; for visible shadow receivers in the identified groups of objects, establishing depth information in a small white buffer; for each of the identified groups of objects, rendering the shadow casters into a single depth map; blurring the small white buffer; and upsampling the small white buffer into a full sized white buffer, wherein the upsampling comprises using depth information as a metric.

The methods and embodiments described throughout this application are described with respect to and may be used in 3D computer graphics for rendering shadows. In some embodiments, the method may be used in 3D computer graphics for rendering image based projected shadows. In some embodiments, the method may be used for rendering shadows in real time. However, it should be understood that the above methods and embodiments may be applied to any type of content, such as for example video games, both online and offline game types, simulations, other types of videos, etc. In some embodiments, the above method may be used in any areas where shadowing may be desired and/or of importance.

While the invention herein disclosed has been described by means of specific embodiments, examples and applications thereof, numerous modifications and variations could be made thereto by those skilled in the art without departing from the scope of the invention set forth in the claims.

What is claimed is:

1. A non-transitory computer readable storage medium storing one or more computer programs adapted to cause a processor based system to execute steps comprising:
    identifying a set of shadow casters and a set of shadow receivers in a frame of a scene that is lighted by at least a first light source;
    constructing a first three-dimensional (3D) grid, from the first light source's point of view, that fully encloses a first volume of the scene, comprising one or more shadow casters of the set of shadow casters that fall within the first volume of the scene;
    projecting each of the one or more shadow casters to generate one or more projected shadow casters;
    performing a union of each cell of the first 3D grid and at least one of the one or more shadow casters to form one or more grown cells of the first grid;
    constructing a second three-dimensional (3D) grid, from the first light source's point of view, that fully encloses the first volume of the scene, comprising one or more shadow receivers of the set of shadow receivers that fall within the first volume of the scene;
    performing a union of each cell of the second 3D grid corresponding to a cell of the first grid having at least one grown cell of the first grid and at least one of the one or more shadow receivers to form one or more grown cells of the second grid;
    marking for rendering each shadow receiver for which a grown cell of the second 3D grid has been formed;
    forming one or more grown cells of a third 3D grid by intersecting the first 3D grid with the second 3D grid such that the third 3D grid comprises the grown cells of the first grid and the grown cells of the second grid that intersect; and
    marking for rendering into a shadow map each shadow caster that intersects the third 3D grid.

2. The non-transitory computer readable storage medium of claim 1, wherein the one or more computer programs are further adapted to cause the processor based system to execute steps comprising:
  partitioning a screen into a two-dimensional (2D) grid;
  projecting each cell of the 2D grid from a near plane to a far plane to form a corresponding frustum;
  for each cell of the 2D grid, determining whether or not any grown cells of the third 3D grid fall within the corresponding frustum; and
  excluding each cell of the 2D grid from receiving shadows for the first light source for which no grown cells of the third 3D grid fall within the corresponding frustum.

3. The non-transitory computer readable storage medium of claim 2, wherein the one or more computer programs are further adapted to cause the processor based system to execute steps comprising:
  for each cell of the 2D grid for which one or more grown cells of the third 3D grid do fall within the corresponding frustum, determining an identity and a volume of the one or more grown cells of the third 3D grid that fall within the corresponding frustum; and
  for each cell of the 2D grid for which one or more grown cells of the third 3D grid do fall within the corresponding frustum, excluding screen pixels whose z-buffer depths fall outside the determined volume of the one or more grown cells of the third 3D grid that fall within the corresponding frustum.

4. The non-transitory computer readable storage medium of claim 2, wherein the one or more computer programs are further adapted to cause the processor based system to execute steps comprising
  determining a 3D AABB intersection volume for each cell of the 2D grid for which one or more grown cells of the third 3D grid fall within the corresponding frustum.

5. The non-transitory computer readable storage medium of claim 1, wherein the one or more computer programs are further adapted to cause the processor based system to execute steps comprising:
  dividing the scene into a plurality of cascades that are broken up along depth from a rendering camera's point of view;
  wherein the first volume of the scene comprises one of the plurality of cascades.

6. The non-transitory computer readable storage medium of claim 1, wherein the one or more computer programs are further adapted to cause the processor based system to execute steps comprising:
  rendering the marked shadow casters into the shadow map.

7. The non-transitory computer readable storage medium of claim 6, wherein the one or more computer programs are further adapted to cause the processor based system to execute steps comprising:
  tiling the shadow map.

8. The non-transitory computer readable storage medium of claim 6, wherein the one or more computer programs are further adapted to cause the processor based system to execute steps comprising:
  performing a depth prepass on rendering geometry in the frame and storing depth information in a depth buffer.

9. The non-transitory computer readable storage medium of claim 8, wherein the one or more computer programs are further adapted to cause the processor based system to execute steps comprising:
  reconstructing shadow receivers by performing steps comprising sampling from the depth buffer and sampling from the shadow map.

10. The non-transitory computer readable storage medium of claim 9, wherein the one or more computer programs are further adapted to cause the processor based system to execute steps comprising:
  during the depth prepass, for each of one or more of pixels, writing into a stencil a value indicating a type of receiver that the pixel is; and
  discriminating which pixels receive shadow based on the corresponding values in the stencil.

11. The non-transitory computer readable storage medium of claim 9, wherein the one or more computer programs are further adapted to cause the processor based system to execute steps comprising:
  dividing the one or more shadow casters into a plurality of categories; and
  discriminating which pixels receive shadow based on the category of a relevant shadow caster.

12. The non-transitory computer readable storage medium of claim 9, wherein the one or more computer programs are further adapted to cause the processor based system to execute steps comprising:
  writing resultant shadow values into a deferred buffer that was initially set to white.

13. The non-transitory computer readable storage medium of claim 12, wherein the one or more computer programs are further adapted to cause the processor based system to execute steps comprising:
  dilating the deferred buffer.

14. The non-transitory computer readable storage medium of claim 12, wherein the one or more computer programs are further adapted to cause the processor based system to execute steps comprising:
  rendering the marked shadow receivers by sampling the deferred buffer.

15. The non-transitory computer readable storage medium of claim 14, wherein the one or more computer programs are further adapted to cause the processor based system to execute steps comprising:
  displaying the rendered shadow receivers on a display.

16. The non-transitory computer readable storage medium of claim 1, wherein the one or more computer programs are further adapted to cause the processor based system to execute steps comprising:
  collecting per draw call bounding information for the set of shadow caster and set of shadow receivers.

17. The non-transitory computer readable storage medium of claim 16, wherein the one or more computer programs are further adapted to cause the processor based system to execute steps wherein the step of constructing the first 3D grid comprises placing the one or more shadow casters within the first 3D grid based on the per draw call bounding information.

18. The non-transitory computer readable storage medium of claim 16, wherein the one or more computer programs are further adapted to cause the processor based system to execute steps wherein the step of constructing the second 3D grid comprises placing the one or more shadow receivers within the first 3D grid based on the per draw call bounding information.

19. A method, comprising:
  identifying, with a processor based device, a set of shadow casters and a set of shadow receivers in a frame of a scene that is lighted by at least a first light source;
  constructing a first three-dimensional (3D) grid, from the first light source's point of view, that fully encloses a first volume of the scene, comprising one or more shadow casters of the set of shadow casters that fall within the first volume of the scene;

projecting each of the one or more shadow casters to generate one or more projected shadow casters;
performing a union of each cell of the first 3D grid and at least one of the one or more projected casters to form one or more grown cells of the first grid;
constructing a second three-dimensional (3D) grid, from the first light source's point of view, that fully encloses the first volume of the scene, comprising one or more shadow receivers of the set of shadow receivers that fall within the first volume of the scene;
performing a union of each cell of the second 3D grid corresponding to a cell of the first grid having at least one grown cell of the first grid and at least one of the one or more shadow receivers to form one or more grown cells of the second grid;
marking for rendering each shadow receiver for which a grown cell of the second 3D grid has been formed;
forming one or more grown cells of a third 3D grid by intersecting the first 3D grid with the second 3D grid such that the third 3D grid comprises the grown cells of the first grid and the grown cells of the second grid that intersect; and
marking for rendering into a shadow map each shadow caster that intersects the third 3D grid.

20. The method of claim 19, further comprising:
partitioning a screen into a two-dimensional (2D) grid;
projecting each cell of the 2D grid from a near plane to a far plane to form a corresponding frustum;
for each cell of the 2D grid, determining whether or not any grown cells of the third 3D grid fall within the corresponding frustum; and
excluding each cell of the 2D grid from receiving shadows for the first light source for which no grown cells of the third 3D grid fall within the corresponding frustum.

21. The method of claim 20, further comprising:
for each cell of the 2D grid for which one or more grown cells of the third 3D grid do fall within the corresponding frustum, determining an identity and a volume of the one or more grown cells of the third 3D grid that fall within the corresponding frustum; and
for each cell of the 2D grid for which one or more grown cells of the third 3D grid do fall within the corresponding frustum, excluding screen pixels whose z-buffer depths fall outside the determined volume of the one or more grown cells of the third 3D grid that fall within the corresponding frustum.

22. An apparatus, comprising:
a display; and
a processor based system coupled to the display, wherein the processor based system is configured to execute steps comprising:
identifying a set of shadow casters and a set of shadow receivers in a frame of a scene that is lighted by at least a first light source;
constructing a first three-dimensional (3D) grid, from the first light source's point of view, that fully encloses a first volume of the scene, comprising one or more shadow casters of the set of shadow casters that fall within the first volume of the scene;
projecting each of the one or more shadow casters to generate one or more projected shadow casters;
performing a union of each cell of the first 3D grid and at least one of the one or more projected casters to form grown cells of the first grid;
constructing a second three-dimensional (3D) grid, from the first light source's point of view, that fully encloses the first volume of the scene, comprising one or more shadow receivers of the set of shadow receivers that fall within the first volume of the scene;
performing a union of each cell of the second 3D grid that corresponds to a cell of the first grid having at least one grown cell of the first grid at least one of the one or more shadow receivers;
marking for rendering each shadow receiver for which a cell of the second 3D grid has been grown;
forming grown cells of a third 3D grid by intersecting the first 3D grid with the second 3D grid such that the third 3D grid comprises the grown cells of the first grid and the grown cells of the second grid that intersect; and
marking for rendering into a shadow map each shadow caster that intersects the third 3D grid.

23. The apparatus of claim 22, wherein the processor based system is further configured to execute steps comprising:
partitioning a screen into a two-dimensional (2D) grid;
projecting each cell of the 2D grid from a near plane to a far plane to form a corresponding frustum;
for each cell of the 2D grid, determining whether or not any grown cells of the third 3D grid fall within the corresponding frustum; and
excluding each cell of the 2D grid from receiving shadows for the first light source for which no grown cells of the third 3D grid fall within the corresponding frustum.

24. The apparatus of claim 23, wherein the processor based system is further configured to execute steps comprising:
for each cell of the 2D grid for which one or more grown cells of the third 3D grid do fall within the corresponding frustum, determining an identity and a volume of the one or more grown cells of the third 3D grid that fall within the corresponding frustum; and
for each cell of the 2D grid for which one or more grown cells of the third 3D grid do fall within the corresponding frustum, excluding screen pixels whose z-buffer depths fall outside the determined volume of the one or more grown cells of the third 3D grid that fall within the corresponding frustum.

* * * * *

UNITED STATES PATENT AND TRADEMARK OFFICE
CERTIFICATE OF CORRECTION

PATENT NO. : 8,325,186 B2  
APPLICATION NO. : 12/784435  
DATED : December 4, 2012  
INVENTOR(S) : Ben Diamand Page 1 of 1

It is certified that error appears in the above-identified patent and that said Letters Patent is hereby corrected as shown below:

In the Claims, Column 26, Line 18, Claim 22, delete "grid at" and insert --grid and at--, therefor.

Signed and Sealed this
Twelfth Day of March, 2013

Teresa Stanek Rea
*Acting Director of the United States Patent and Trademark Office*